United States Patent
Kawada

(10) Patent No.: US 7,952,618 B2
(45) Date of Patent: May 31, 2011

(54) APPARATUS FOR CONTROLLING DISPLAY OF DETECTION OF TARGET IMAGE, AND METHOD OF CONTROLLING SAME

(75) Inventor: Yukihiro Kawada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1044 days.

(21) Appl. No.: 11/657,601

(22) Filed: Jan. 25, 2007

(65) Prior Publication Data

US 2007/0177036 A1    Aug. 2, 2007

(30) Foreign Application Priority Data

Jan. 27, 2006  (JP) .................................. 2006-018312

(51) Int. Cl.
*H04N 5/262* (2006.01)
*G06K 9/00* (2006.01)

(52) U.S. Cl. ........................................ 348/239; 382/118
(58) Field of Classification Search .................... None
See application file for complete search history.

(56) References Cited

U.S. PATENT DOCUMENTS

| | | | |
|---|---|---|---|
| 6,856,901 B2 * | 2/2005 | Han .............................. | 701/211 |
| 6,987,535 B1 * | 1/2006 | Matsugu et al. .............. | 348/239 |
| 7,317,485 B1 | 1/2008 | Miyake et al. | |
| 7,349,020 B2 * | 3/2008 | Stavely et al. ............ | 348/333.02 |
| 7,574,016 B2 * | 8/2009 | Steinberg et al. ............. | 382/103 |
| 2004/0120561 A1 * | 6/2004 | Goto .............................. | 382/128 |
| 2007/0013791 A1 * | 1/2007 | Kinoshita et al. ............. | 348/239 |
| 2007/0242143 A1 | 10/2007 | Sugimoto | |

FOREIGN PATENT DOCUMENTS

| | | |
|---|---|---|
| JP | 2000-333045 | 11/2000 |
| JP | 2004-46591 | 2/2004 |
| JP | 2004-320287 | 11/2004 |
| JP | 2005-156967 | 6/2005 |
| JP | 2005-269562 | 9/2005 |
| JP | 2005-286940 A | 10/2005 |
| JP | 2005-318515 | 11/2005 |
| JP | 2007-067560 | 3/2007 |

* cited by examiner

*Primary Examiner* — Luong T Nguyen
(74) *Attorney, Agent, or Firm* — Birch, Stewart, Kolasch & Birch, LLP

(57) ABSTRACT

If a user is to be notified of detection of a face image, it is so arranged that the user can be so notified without being given an odd impression. To achieve this, the image of a subject is obtained by sensing the image of the subject. The image of the subject obtained contains a portrait image, and the face-image portion of the portrait image is detected by executing processing for detecting a face image. When a face image is detected, an apple mark, strawberry mark or heart mark, etc., is displayed near the detected face image. Instead of enclosing the face image within a rectangular border, the mark is displayed near the face image. The result is that the user is not given an odd impression.

3 Claims, 21 Drawing Sheets

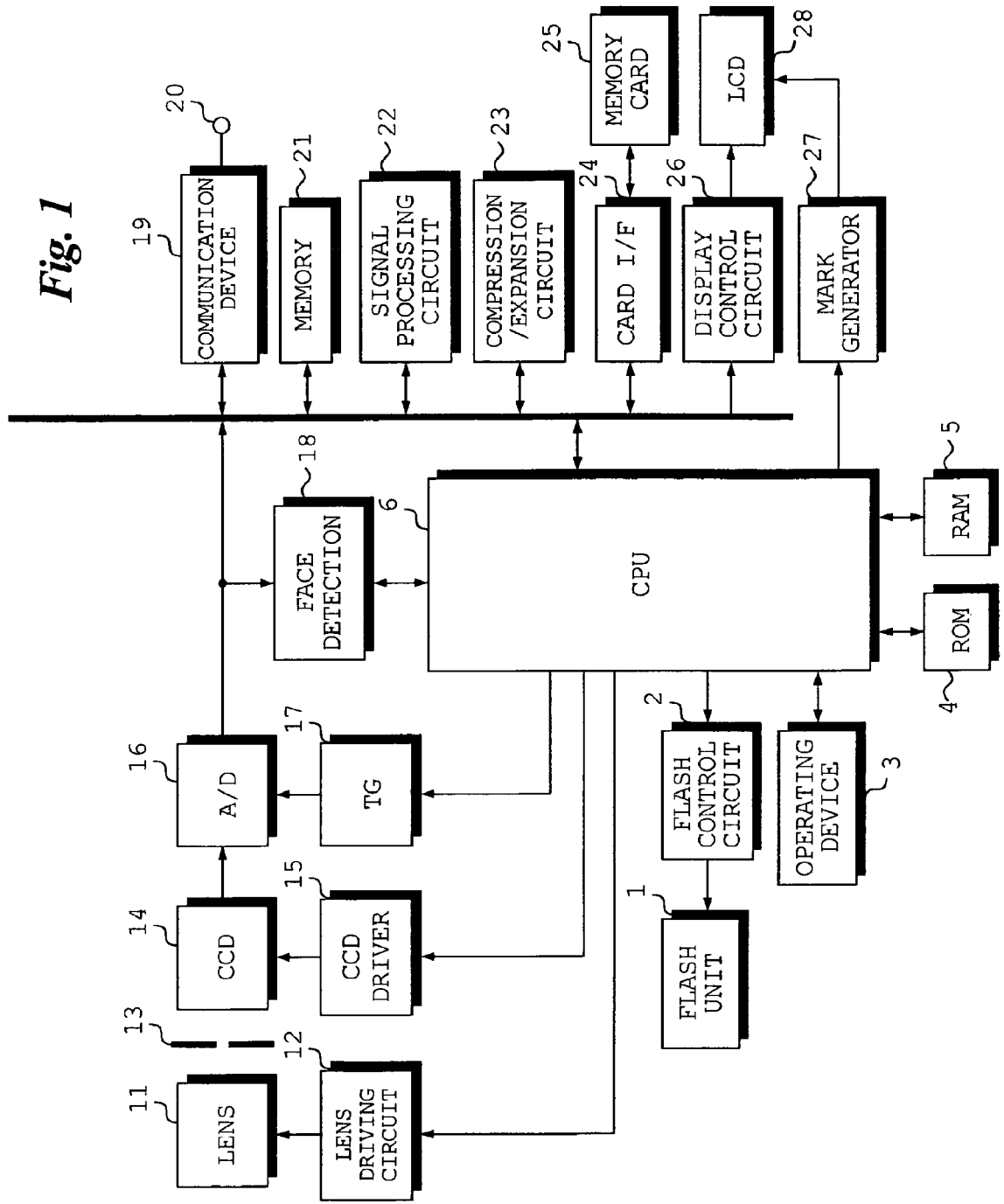

Fig. 3

| MARK NO. | MARK (TYPE) | | SIZE | | | | | FACE-LIKE DEGREE |
|---|---|---|---|---|---|---|---|---|
| | | | S1 | S2 | S3 | S4 | S5 | |
| 1 | FRUIT | APPLE | ○ | ○ | ○ | ○ | ○ | HIGH |
| 2 | | GRAPE | ○ | ○ | ○ | ○ | ○ | |
| 3 | | BANANA | ○ | ○ | ○ | ○ | ○ | |
| 4 | | CHERRY | ○ | ○ | ○ | ○ | ○ | |
| 5 | | STRAWBERRY | ○ | ○ | ○ | ○ | ○ | |
| 6 | ANIMAL | DOG | ○ | ○ | ○ | ○ | ○ | MEDIUM |
| 7 | | CAT | ○ | ○ | ○ | ○ | ○ | |
| 8 | | BADGER | ○ | ○ | ○ | ○ | ○ | |
| 9 | | HORSE | ○ | ○ | ○ | ○ | ○ | |
| 10 | | MOUSE | ○ | ○ | ○ | ○ | ○ | |
| 11 | VEGETABLE | PUMPKIN | ○ | ○ | ○ | ○ | ○ | LOW |
| 12 | | CABBAGE | ○ | ○ | ○ | ○ | ○ | |
| 13 | | MUSHROOM | ○ | ○ | ○ | ○ | ○ | |
| 14 | | TOMATO | ○ | ○ | ○ | ○ | ○ | |
| 15 | | CUCUMBER | ○ | ○ | ○ | ○ | ○ | |

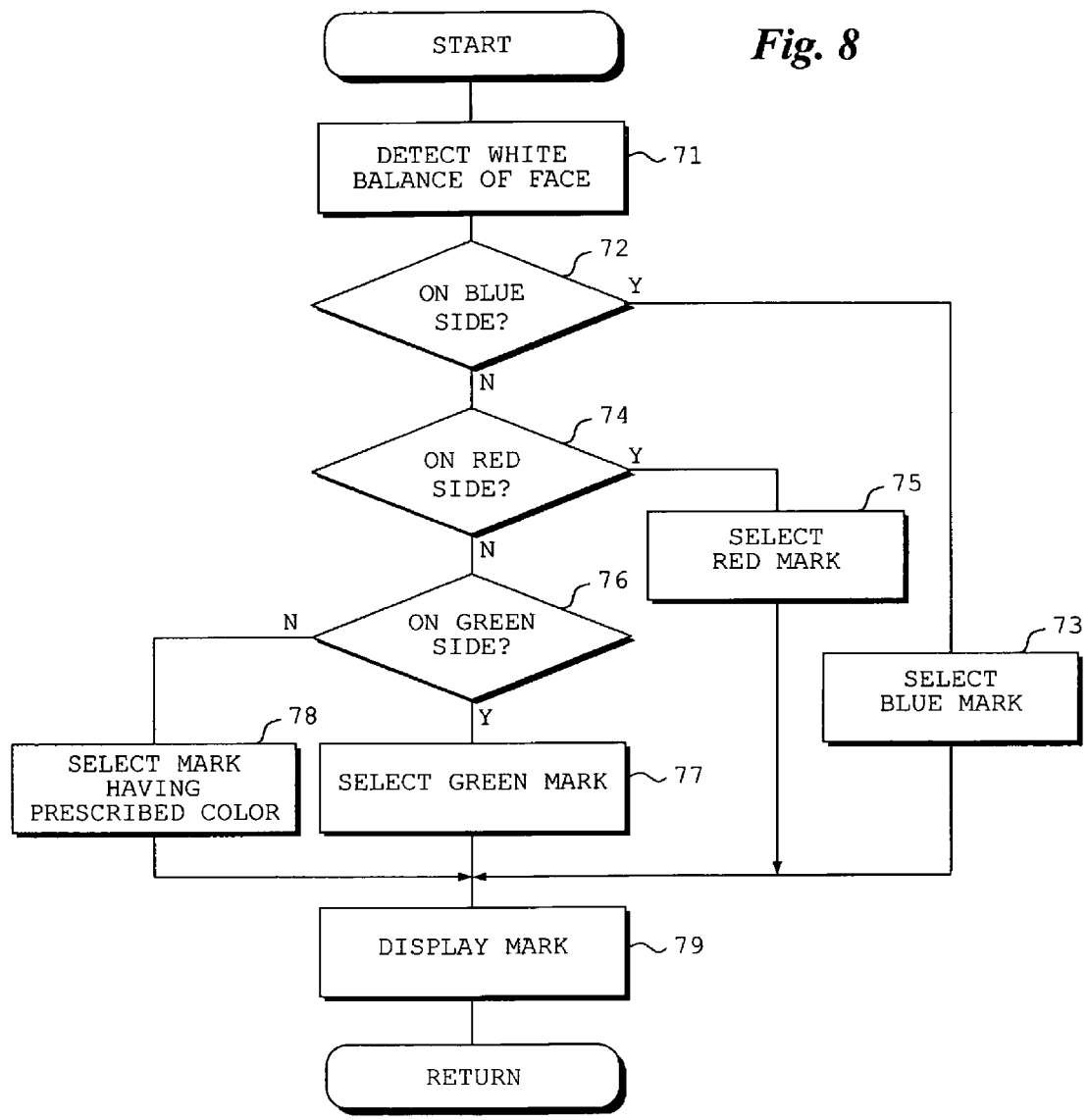

APPARATUS FOR CONTROLLING DISPLAY OF DETECTION OF TARGET IMAGE, AND METHOD OF CONTROLLING SAME

BACKGROUND OF THE INVENTION

1. Field of the Invention

This invention relates to an apparatus for controlling display of detection of a target image, and to a method of controlling this apparatus.

2. Description of the Related Art

Consideration has been given to digital cameras and printers, etc., that detect a target image such as a face image from within the image of a subject and display the detected face image within an enclosing rectangular border (see the specification of Japanese Patent Application Laid-Open No. 2005-286940).

However, merely displaying a detected face image within an enclosing rectangular border may give the viewer of the image of the subject an odd impression.

SUMMARY OF THE INVENTION

Accordingly, an object of the present invention is to notify a user, without giving the user an odd impression, of the fact that a target image has been detected.

According to the present invention, the foregoing object is attained by providing an apparatus for controlling display of detection of a target image, comprising: a target image detecting device for detecting a target image from within an applied image of a subject; a determination device for determining whether a target image has been detected by the target image detecting device; and a display control device, responsive to a determination by the determination device that a target image has been detected by the target image detecting device, for controlling a display device so as to display a mark and the image of the subject on a display screen in such a manner that the mark will appear in the vicinity of the detected target image.

The present invention also provides a control method suited to the above-described apparatus for controlling display of detection of a target image. Specifically, the present invention provides a method of controlling an apparatus for controlling display of detection of a target image, comprising the steps of: detecting a target image from within an applied image of a subject; determining whether a target image has been detected; and, in response to a determination that a target image has been detected, controlling a display device so as to display a mark and the image of the subject on a display screen in such a manner that the mark will appear in the vicinity of the detected target image.

In accordance with the present invention, a target image is detected from within an applied image of a subject. If it is determined that a target image has been detected, a display device is controlled so as to display a mark and the image of the subject on a display screen in such a manner that the mark will appear in the vicinity of the detected target image. The mark appears in the vicinity of the detected target image; the target image is not enclosed as by a rectangular border. The mark may be a graphic such as a heart or circle, a character such as a fruit, animal or vegetable, or a symbol such as an alphabetic character or sign. Since a mark is displayed in the vicinity of the target image on the display screen without the target image being enclosed by a border, the user viewing the image of the subject is not given an odd impression.

Preferably, it is so arranged that in accordance with the size of a target image detected by the target image detecting device or the degree to which a detected image is target-image like, at least one among the size, color, transparency, type, display position, shape and motion of the mark displayed on the display screen changes. By observing the mark, the viewer can ascertain the size of the detected target image or the degree to which the detected image is target-image like.

By way of example, the display control device controls the display device in such a manner that the mark, which has a color that is a complementary color of the color at a position on the display screen where the mark is displayed, and the image of the subject are displayed on the display screen. This makes it possible to distinguish between the color of the displayed mark and the color surrounding the mark, thereby making it easier to see the mark.

By way of example, the display control device displays the mark on the circumference of a circle having a center that is the position of the center of the target image detected by the target image detecting device, and a radius that is the distance from the center to any peripheral portion of the detected target image.

In this case, the display control device would include a deciding device for deciding a position on the circumference of the circle based upon an angle determined by a random number; and a device which, in the event that the position on the circumference of the circle decided by the deciding device falls off the display screen, is for controlling the deciding device so as to repeat processing, which is for deciding a position on the circumference of the circle based upon an angle determined by a random number, until the position falls within the display screen; the mark preferably being displayed at the decided position on the circumference of the circle within the display screen. The mark can be displayed within the limits of the display screen even in a case where the display position of the mark has been decided based upon a random number.

The mark may be a moving image or a still image.

The apparatus may further comprise an image sensing device for sensing the image of a subject and outputting image data representing the image of the subject formed on a photoreceptor surface; and an exposure adjusting device for adjusting amount of exposure on the photoreceptor surface. In this case, the target image detecting device detects the target image from within the image of the subject represented by the image data that has been output from the image sensing device. Depending upon whether the amount of exposure adjusted by the exposure adjusting device is an appropriate value or not, at least one among the size, color, transparency, type, display position, shape and motion of the mark displayed on the display screen changes.

Since the mark displayed changes depending upon whether the amount of exposure is appropriate or not, one can ascertain by observing the change in the mark whether the amount of exposure is appropriate.

The apparatus may further comprise an image sensing device for sensing the image of a subject and outputting image data representing the image of the subject formed on a photoreceptor surface; and a focus control device for controlling degree of focusing of the image of the subject on the photoreceptor surface. In this case, the target image detecting device detects the target image from within the image of the subject represented by the image data that has been output from the image sensing device. Depending upon whether the focus-controlled image of the subject is in focus or not, preferably at least one among the size, color, transparency, type, display position, shape and motion of the mark displayed on the display screen is changed.

Since the mark displayed changes between the mark in a case where the image is in focus and the mark in a case where the image is not in focus, one can ascertain by observing the change in the mark whether the image is in focus.

The apparatus may further comprise an image sensing device for sensing the image of a subject and outputting image data representing the image of the subject; and a composition determination device for determining acceptability of the composition of the image of the subject represented by the image data that has been output from the image sensing device. In this case, in response to a determination by the composition determination device that the composition of the image of the subject is acceptable, preferably at least one among the size, color, transparency, type, display position, shape and motion of the mark displayed on the display screen is changed in comparison with such time that the composition of the image of the subject is unacceptable.

Since the mark displayed in the case of an acceptable composition changes in comparison with when the composition is not acceptable, one can ascertain by observing the change in the mark whether the composition is acceptable or not.

In response to a determination by the composition determination device that the composition of the subject is unacceptable, the mark displayed by the display control device may be a mark specifying the position of the subject or a mark for performing an operation that will move the subject in a direction in which it should be moved.

Further, the image of the subject is a color image, and the apparatus may further comprise a color detecting device for detecting the color of the target image detected by the target image detecting device. In this case, the display control device would control the display device so as to display, on the display screen, the image of the subject and the mark having a color conforming to the color detected by the color detecting device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the electrical structure of a digital still camera;

FIG. 3 illustrates an example of a mark table;

FIG. 8 is a flowchart illustrating processing for displaying a mark;

DESCRIPTION OF THE PREFERRED EMBODIMENTS

Figure 2A:
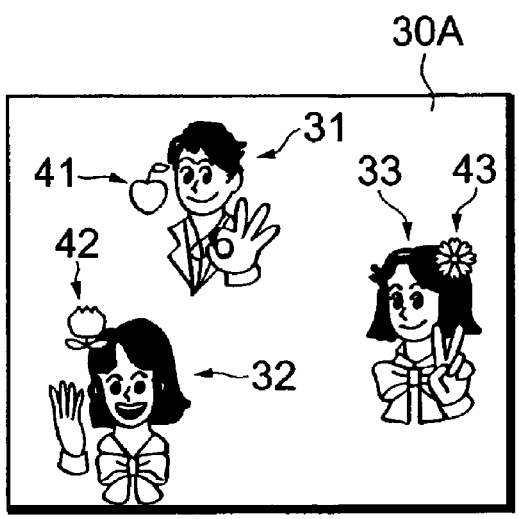
FIGS. 2A to 2D illustrate examples of images of subjects.

Preferred embodiments of the present invention will now be described in detail with reference to the drawings.

FIG. 1, which illustrates an embodiment of the invention, is a block diagram illustrating the electrical structure of a digital still camera.

The overall operation of the digital still camera is controlled by CPU 6.

The digital still camera has an operating device 3 that includes various buttons such as a shutter-release button of two-step stroke type, a mode setting switch and a menu button. Operating signals that are output from the operating device 3 are input to the CPU 6. Connected to the CPU 6 are a ROM 4 storing the operating program of the digital still camera and other necessary data, and a RAM 5 for storing data temporarily.

The digital still camera is provided with a flash unit 1 for flash photography. The flash unit 1 has its light emission controlled by a flash control circuit 2 controlled by the CPU 6.

An imaging lens 11 and an iris 13 are provided in front of a CCD 14. The imaging lens 11 has its position controlled by a lens driving circuit 12, which is controlled by the CPU 6, in such a manner that the image of the subject is formed on the photoreceptor surface of the CCD 14. The iris 13 has its f-number value controlled by an iris control circuit (not shown), which is controlled by the CPU 6, in such a manner that an appropriate exposure is obtained.

If the image sensing mode is set by the mode setting switch, the image of the subject is sensed by the CCD 14. Driving the CCD 14 by a CCD driver 15 causes the CCD 14 to output a video signal representing the image of the subject. The video signal is converted to digital image data in an analog/digital converting circuit 16 that operates based upon clock pulses supplied from a timing generator 17.

The image data obtained by the conversion in the analog/digital converting circuit 16 is input to a signal processing circuit 22. The latter executes corrections such as an offset correction, gain correction and gamma correction. The image data output from the signal processing circuit 22 is input to a display control circuit 26. A liquid crystal display device 28 is controlled by the display control circuit 26, whereby the image of the subject is displayed on the display screen of the liquid crystal display device 28.

In the digital still camera according to this embodiment, the image of a face can be detected from within the image of the subject. In particular, with the digital still camera according to this embodiment, a mark (inclusive of character and symbol), and not a border enclosing the detected image of the face, is displayed in the vicinity of the detected image of the face. By observing the mark, one can determine that a face image has been detected. Since a mark is displayed and not a border enclosing the image of the face, user discomfort can be mitigated in comparison with the case where the face-image enclosing border is displayed. A mark generating circuit 27 is provided in order to display such a mark. Image data representing the mark is supplied from the mark generating circuit 27 to the liquid crystal display device 28. As a result, the mark indicating the detected face image is displayed so as to be superimposed on the image of the subject being displayed on the display screen of the liquid crystal display device 28.

Further, the digital still camera according to this embodiment internally incorporates a communication device 19. Connected to the communication device 19 is a connection terminal 20 for making a connection to a personal computer or the like. This makes it possible for the user to connect the digital still camera to a personal computer, etc.

If the shutter-release button is pressed through half its stroke, the digital image data obtained by the conversion in the analog/digital converting circuit 16 in the manner described above is input to a face detecting unit 18. The latter detects the position of the face image in the image of the subject represented by the entered digital image data. By applying the detected position of the face image to the mark generating circuit 27, the image of the subject having the mark displayed near the face image is displayed on the display screen of the liquid crystal display device 28, as mentioned above.

FIGS. 2A to 2D illustrate examples 30A to 30D, respectively, of subject images displayed on the liquid crystal display device 28.

As shown in FIG. 2A, a subject image 30A contains portrait images 31, 32 and 33. By applying face detection processing to subject image 30A, the face-image portions of the portrait images 31, 32 and 33 are detected and marks 41, 42 and 43 are displayed near the face-image portions of the portrait images 31, 32 and 33, respectively.

Figure 2B:
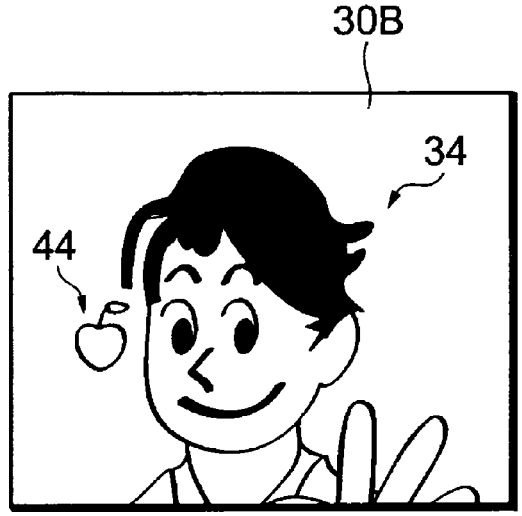
Figure 2C:
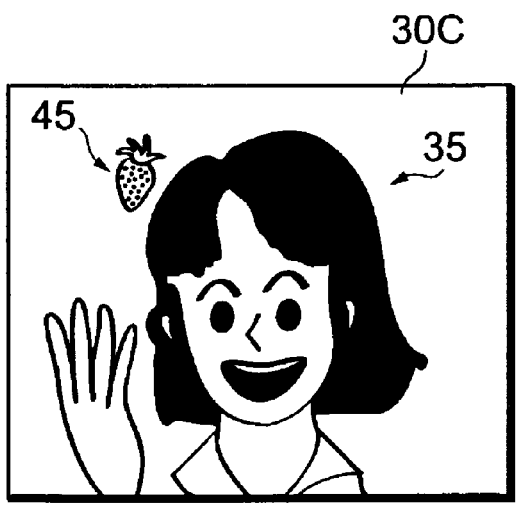

As shown in FIG. 2B, a subject image 30B similarly contains a portrait image 34. By applying face detection processing to subject image 30B, the face-image portion of the portrait image 34 is detected and a mark 44 is displayed near the face-image portion. Similarly, as shown in FIG. 2C, by applying face detection processing to subject image 30C, a mark 45 is displayed near the face-image portion of portrait image 35. By applying face detection processing to subject image 30D, a mark 46 is displayed near the face-image portion of portrait image 36.

Figure 2D:
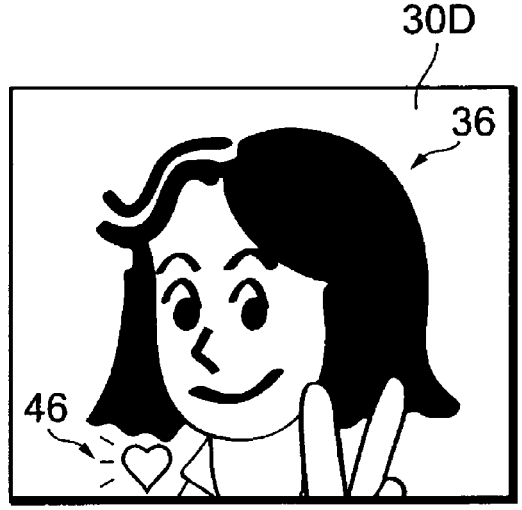

The marks displayed in the vicinity of the face images of portrait image 31 in FIG. 2A and portrait image 34 in FIG. 2B are apple marks 41 and 44, respectively. The marks displayed in the vicinity of the face images of portrait image 32 and 33 in FIG. 2A are flower marks 42 and 43, respectively. The mark displayed in the vicinity of the face image of portrait image 35 in FIG. 2C is a strawberry mark. The mark displayed in the vicinity of the face image of portrait image 36 in FIG. 2D is a heart mark. Thus, a mark may be a picture of any fruit, a symbol, etc.

FIG. 3 illustrates part of a mark table illustrating the nature of displayed marks.

The mark table includes the following items: mark number, mark (type), size and face-like degree. The mark number is used to specify a mark. As for mark (type), marks are defined for every mark type (fruit, animal, vegetable, etc.). Sizes are S1, S2, S3, S4 and S5. A circle symbol under a size indicates that a mark having this size has been stored. Face-like degree represents the result of quantifying the degree to which a detected face image is face-like. The mark (type) displayed changes in accordance with the face-like degree. A fruit mark is displayed if face-like degree is high, an animal mark if face-like degree is medium, and a vegetable mark if face-like degree is low. If the relationship between face-like degree and a mark is known, then, by observing the mark displayed, the user can ascertain how face-like a detected face image is. Mark size, color, transparency, type, display position, shape and motion, etc., can be changed in accordance with face-like degree and face-image size.

The mark table and image data representing the marks corresponding to the mark table are stored in the ROM 4. By applying these from the mark generating circuit 27 to the liquid crystal display device 28, as mentioned above, a mark is displayed on the display screen.

With reference again to FIG. 1, if the shutter-release button is pressed through its full stroke, the image data obtained by the conversion in the analog/digital converting circuit 16 is input also to a signal processing circuit 22 in the manner described above. The signal processing circuit 22 applies an offset correction, a gain correction and a gamma correction, etc. When these corrections are executed in the signal processing circuit 22, the image data is applied to and stored temporarily in a memory 21. The image data that has been stored in the memory 21 is read out under the control of the CPU 6 and is subjected to interpolation processing while it is being read out. The interpolated image data is applied to and stored in the memory 21 again.

The interpolated image data is read out of the memory 21 and input to a compression/expansion circuit 23. The latter compresses the interpolated image data. The compressed image data is applied to and recorded on a memory card 25 via a card interface 24.

If a playback mode is set by the mode setting switch, the compressed image data that has been recorded on the memory card 25 is read via the card interface 24. The read image data is expanded in the compression/expansion circuit 23. The expanded image data is applied to the display control circuit 26, whereby the image of the subject represented by the image data that has been recorded on the memory card 25 is displayed on the display screen of the liquid crystal display device 28.

The expanded image data read from the memory card 25 is applied also to the face detecting unit 18. The latter executes processing for detecting a face image and provides data representing the position of a detected face image. The data representing the position of the face image is applied to the mark generating circuit 27, whereby a mark is displayed in the vicinity of the face-image portion of the image of the subject being displayed on the display screen of the liquid crystal display device 28.

Figure 4:
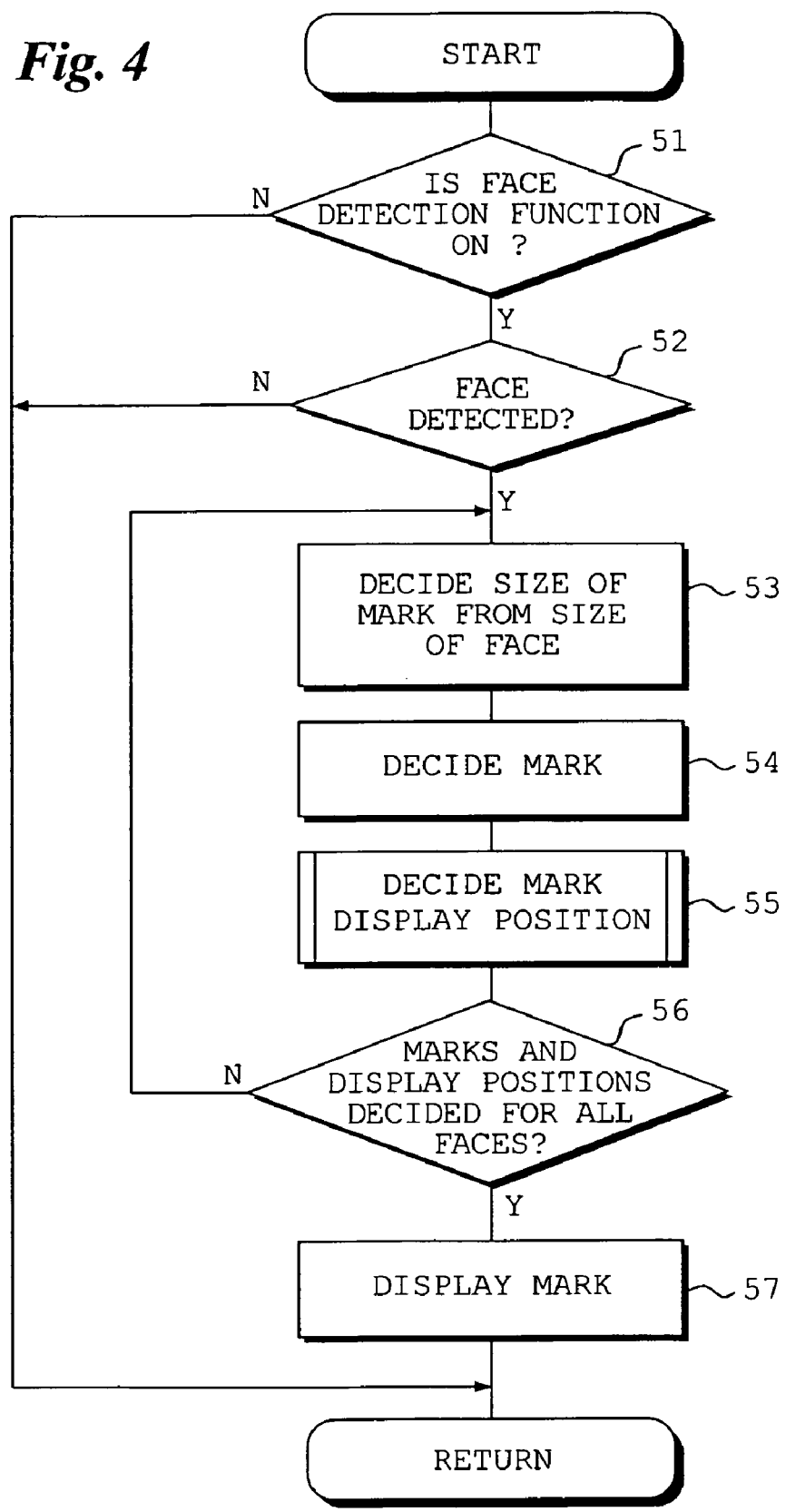
FIG. 4 is a flowchart illustrating processing executed by the digital still camera.

FIG. 4 is a flowchart illustrating processing for displaying a mark.

If the digital still camera has been set in such a manner that face detection processing is executed ("YES" at step 51), then processing is executed to detect the image of a face from within the image of the subject represented by applied subject-image data.

If a face image is detected ("YES" at step 52), the size of a mark is decided so as to display a mark having a size that conforms to the size of the face image detected. Next, a mark is decided in accordance with a face-like degree obtained in face detection processing in the manner described above (step 54). In the example illustrated in FIG. 3, mark type (fruit, animal, vegetable, etc.) is decided in accordance with face-like degree. Therefore, with regard to the specific mark type, this may be decided using a random number or in the order of the mark numbers, by way of example. When a mark is decided, the display position of the decided mark is decided (step 55). Processing for deciding the display position of a mark will be described in detail later.

The processing of steps 53 to 55 is repeated until marks and display positions are decided for all face images contained in the image of the subject ("NO" at step 56). When marks and display positions are decided for all face images contained in the image of the subject ("YES" at step 57), the marks decided are displayed at the display positions that have been decided (step 57).

It goes without that if face detection processing has not been set ("NO" at step 51) or if a face image is not detected from within the image of the subject ("NO" at step 52), then a mark is not displayed.

In the processing described above, mark size and the mark are decided based upon face size and face-like degree. However, it may be so arranged that both mark size and the mark (mark number) are decided using random numbers.

Figure 5:
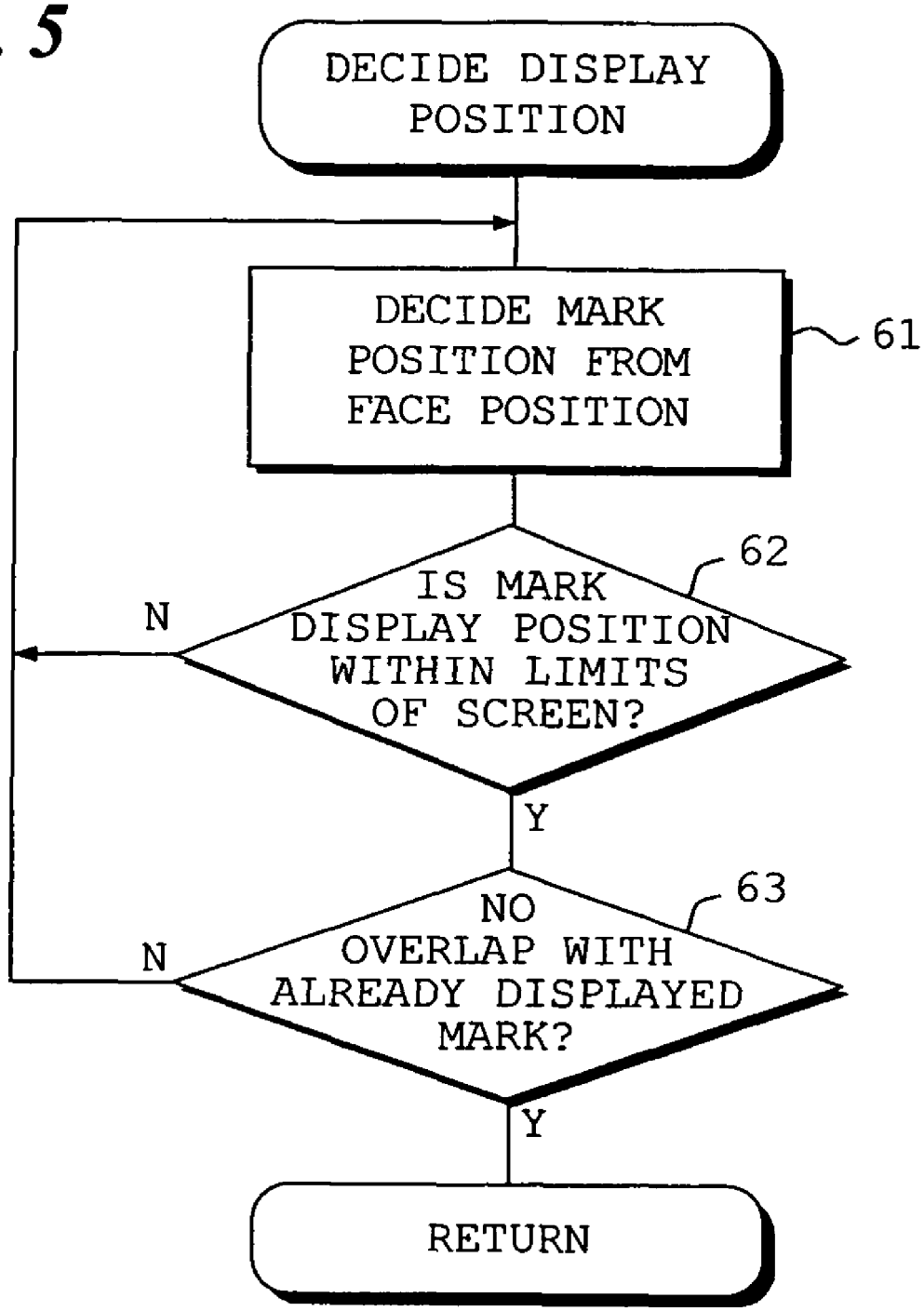
FIG. 5 is a flowchart illustrating processing for deciding display position.

FIG. 5 is a flowchart illustrating processing for deciding the display position of a mark (this is the processing at step 55 in FIG. 4).

First, the display position of the mark is decided based upon the position of the face image detected (step 61).

Figure 6:
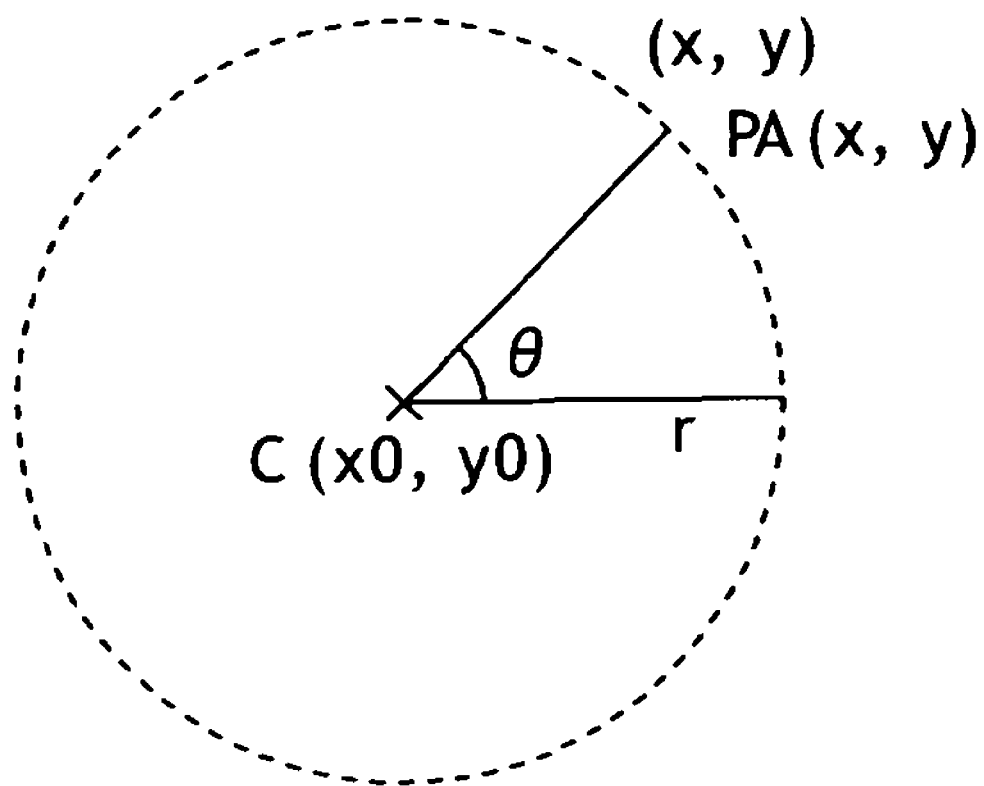
FIG. 6 illustrates the relationship between the center position of a face and a mark display position.

FIG. 6 illustrates the relationship between the center of a face and the display position of a mark in a case where the display position of the mark is decided.

Let C(x0,y0) represent the center of the detected face image, and let r represent one-half of the width of the detected face image (either the shortest or longest length from the center of the face to the edge of the face) In this case, a display position PA(x,y) of a mark can be expressed by Equations (1) and (2) below.

$$x = r \times \cos\theta + x0 \qquad \text{Equation (1)}$$

$$y = r \times \sin\theta + y0 \qquad \text{Equation (2)}$$

where θ employs a random number and is measured in units of radians.

With reference again to FIG. 5, whether the decided display position of the mark falls within the limits of display screen of the liquid crystal display device 28 is checked (step 62). If the mark does not fall within the limits of the screen ("NO" at step 62), the mark will no longer be displayed and hence the decision processing at step 61 is executed again. If the mark falls within the limits of the screen ("YES" at step 62), whether the mark overlaps a mark already being displayed is checked (step 63), taking into consideration a time when one frame of the image of a subject contains a plurality of face images and a plurality of marks are displayed. If there is overlap ("NO" at step 63), then the processing of steps 61 and 62 is executed again in such a manner that marks will not overlap. If there is no overlap ("YES" at step 63), the mark is displayed at the decided position.

Although the color of the mark is not taken into account in the above-described example, the color of the mark and the color of the subject image at the display position of the mark may be considered.

Figure 7:
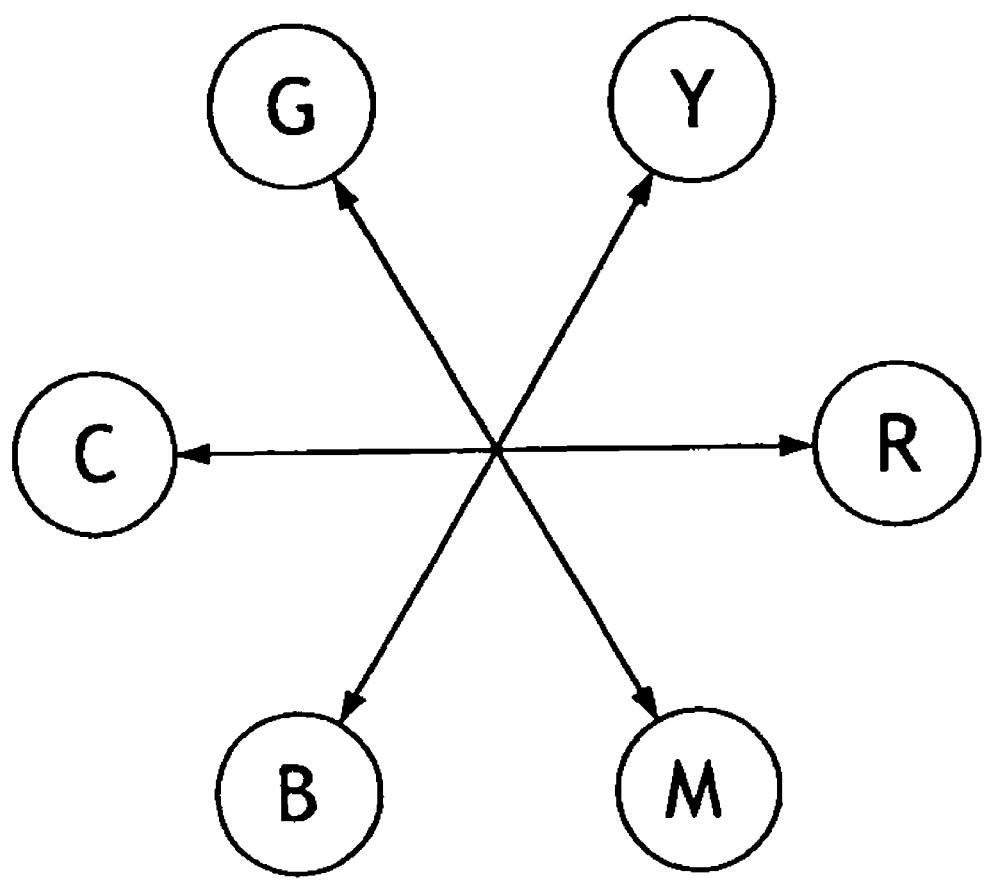
FIG. 7 illustrates the relationship between colors and complementary colors thereof.

FIG. 7 illustrates color relationships.

There is a complementary-color relationship between green and magenta, between red and cyan and between blue and yellow. Therefore, in a case where the color of a subject image at a position where a mark is to be displayed is green, red or blue (or a color approximating any these colors), a magenta, cyan or yellow (or a color approximating any of these colors) mark, respectively, is generated (the mark may be selected if it has been stored in advance). Conversely, in a case where the color of a subject image at a position where a mark is to be displayed is magenta, cyan or yellow (or a color approximating any these colors), a green, red or blue (or a color approximating any of these colors) mark, respectively, is generated.

Since the color of the mark is in a complementary-color relationship with the color at the position of the subject image to be displayed, the mark becomes easier for the user to see.

Figure 9A:
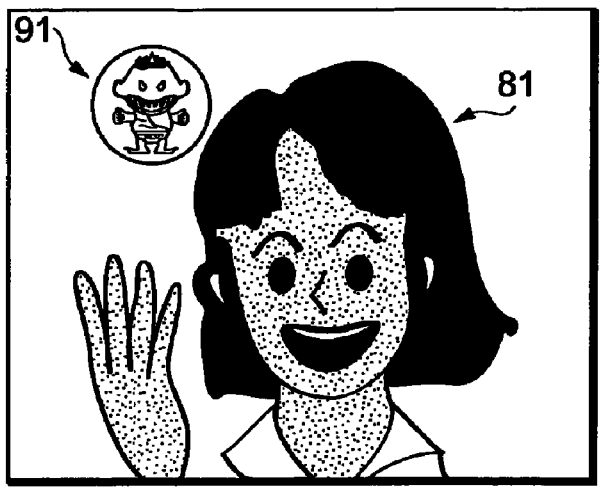
FIGS. 9A to 9C illustrate examples of images of a subject.
Figure 9B:
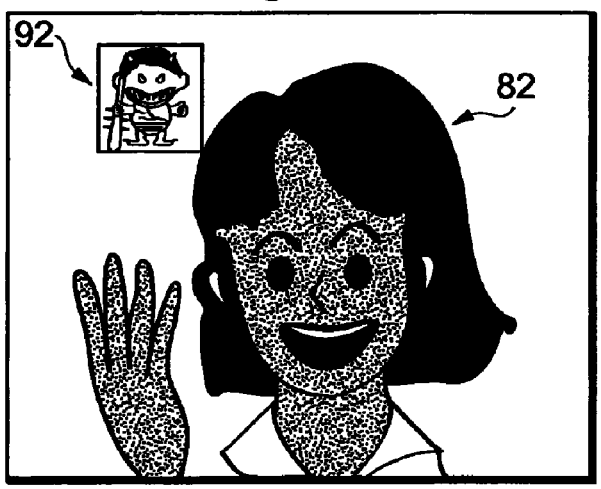
Figure 9C:
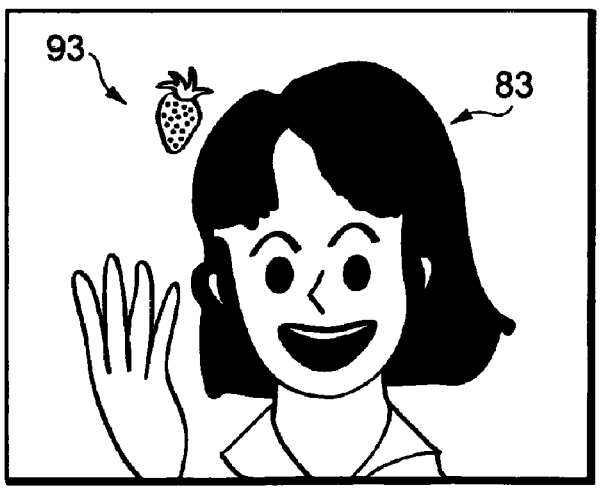

FIG. 8 is a flowchart illustrating processing for displaying a mark. In this processing, the white balance of a detected face image is detected and the color of a mark is decided (or a mark having such a color is decided) in accordance with the white balance detected. FIGS. 9A, 9B and 9C are examples of images of a subject.

If the image of a face is detected from within the image of a subject, then the white balance of the detected face image is detected (step 71).

If the face image is determined to be on the blue side by the white-balance detection processing ("YES" at step 72), a blue mark is selected and displayed (steps 73, 79). As shown in FIG. 9A, it is assumed that the white balance of the face-image portion of a subject image 81 has been determined to be on the blue side. In such case a blue goblin (mark) (enclosed by a circle in order to indicate that the color is blue) 91 is displayed at the upper left of the face image. By displaying the blue goblin, one can ascertain merely by viewing the blue goblin 91 that the face image is on the blue side.

With reference again to FIG. 8, if the face image is determined to be on the red side by the white-balance detection processing ("NO" at step 72 and "YES" at step 74), a red mark is selected and displayed (steps 75, 79). As shown in FIG. 9B, it is assumed that the white balance of the face-image portion of a subject image 82 has been determined to be on the red side. In such case a red goblin (mark) (enclosed by a rectangle in order to indicate that the color is red) 92 is displayed at the upper left of the face image. One can ascertain that the face image is on the red side merely by viewing the red goblin 92.

Again with reference again to FIG. 8, if the face image is determined to be on the green side by the white-balance detection processing ("NO" at step 74 and "YES" at step 76), a green mark, e.g., a green goblin, is selected and displayed (step 79). One can ascertain that the face image is on the green side merely by viewing the green goblin 92.

If the face image is not on the green side ("NO" at step 74 and "NO" at step 76), a mark of a prescribed color is selected and displayed (steps 78, 79). For example, if the face-image portion of a subject image 83 is neither on the blue side, red side nor green side, a prescribed strawberry mark 93 is displayed at the upper left of the face image, as illustrated in FIG. 9C. Preferably, the strawberry mark 93 is achromatic so that one can ascertain that the face image is not on the red side. It goes without saying that a mark having a prescribed color other than the strawberry mark 93 may be displayed.

In FIGS. 10 to 18, a displayed mark is changed in accordance with the position of the face image.

Figure 10:
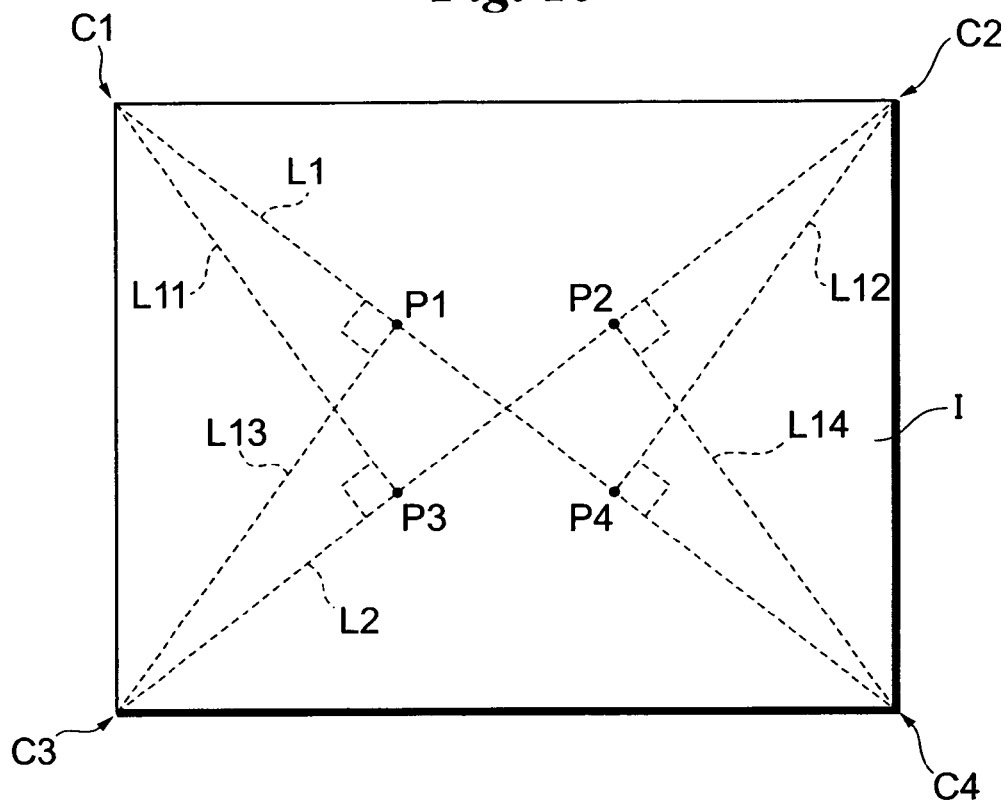
FIG. 10 illustrates a method of deciding a golden ratio.
Figure 11:
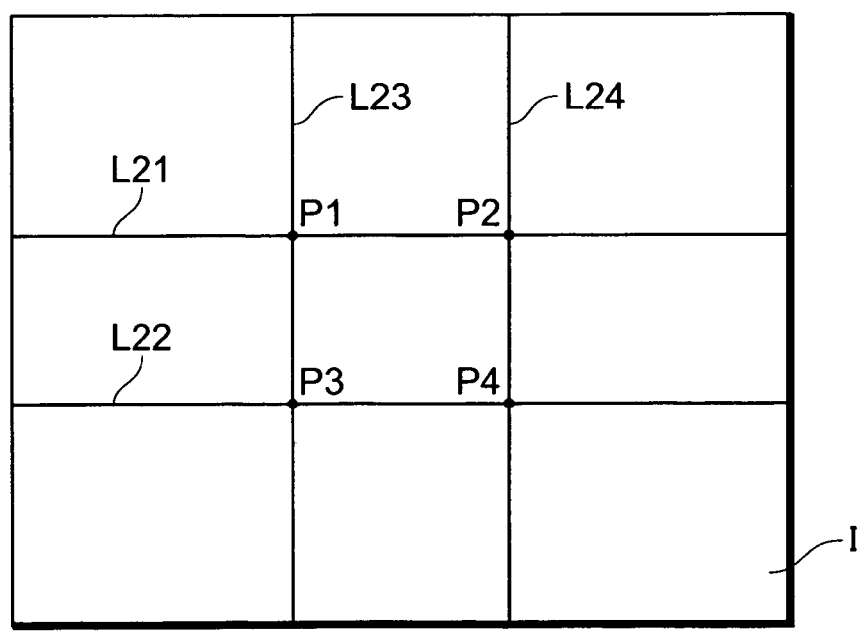
FIG. 11 illustrates a golden ratio.

FIG. 10 illustrates a method of determining a so-called golden ratio (golden section), and FIG. 11 illustrates the golden ratio.

As shown in FIG. 10, diagonals L1 and L2 are defined from each of four apices C1, C2, C3 and C4 of a rectangular subject image I. Points P4 and P1 are decided. These are points of intersection with the diagonal L1 when perpendiculars are dropped from the apices C2 and C3 so as to form right angles with the diagonal L1. Further, points P3 and P2 are decided. These are points of intersection with the diagonal L2 when perpendiculars are dropped from the apices C1 and C4 so as to form right angles with the diagonal L2.

As shown in FIG. 11, there are defined a horizontal line L21 passing through the points of intersection P1 and P2, a horizontal line L22 passing through the points of intersection P3 and P4, a vertical line L23 passing through the points of intersection P1 and P3 and a vertical line L24 passing through the points of intersection P2 and P4. The ratio of the areas obtained by partitioning the subject image I by the horizontal lines L21 and L22 and vertical lines L23 and L24 is referred to as the golden ratio. An angle that will result in the point of intersection P1, P2, P3 or P4 falling at the center of a face image is considered to be the best angle. The mark is displayed so as to obtain the best angle.

Figure 12:
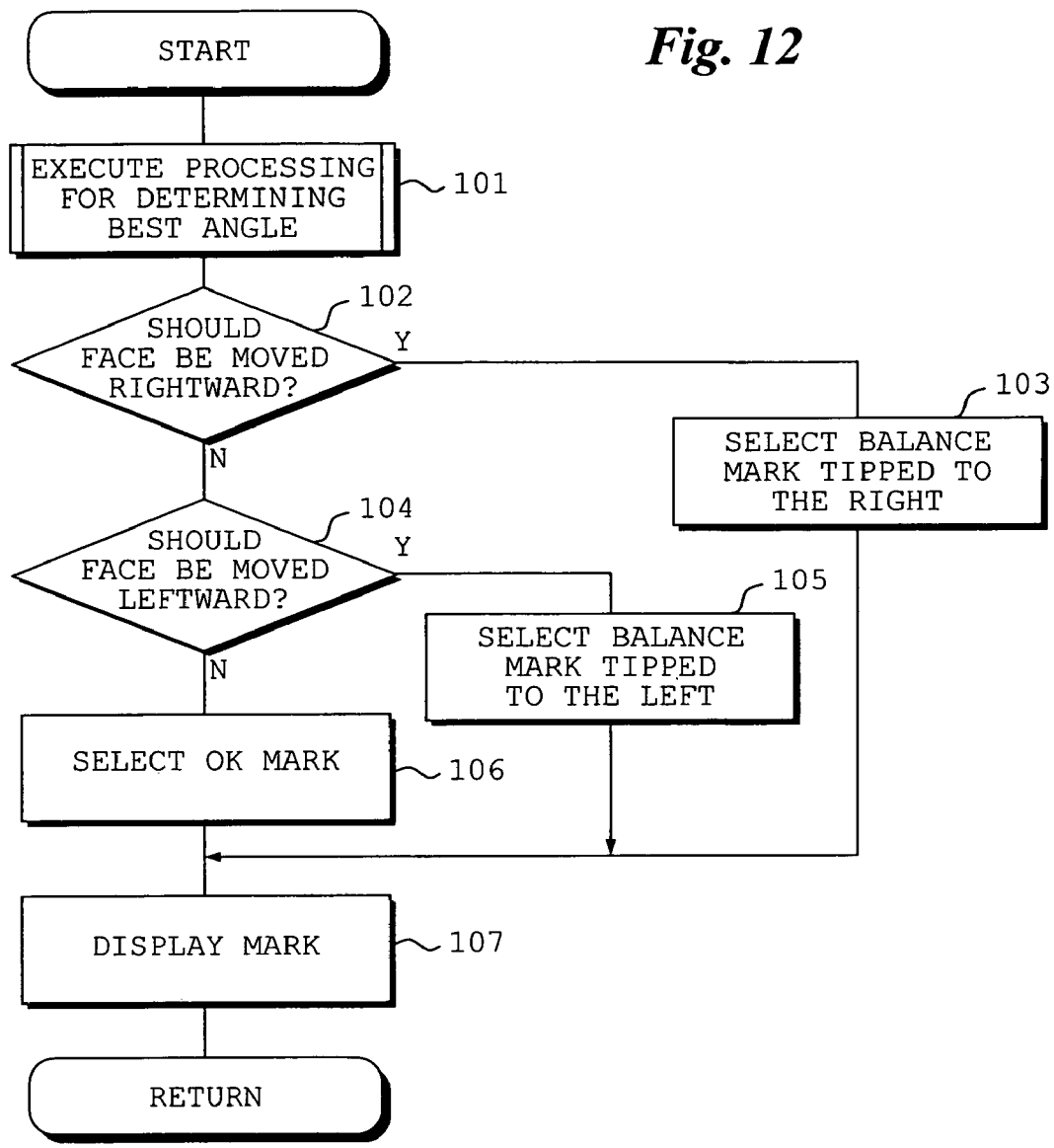
FIG. 12 is a flowchart illustrating processing for displaying a mark.

FIG. 12 is a flowchart illustrating processing for displaying a mark.

Processing for checking the best angle is executed based upon the image of the subject (step 101). This processing for checking the best angle will be described in detail later.

If face detection processing is executed and the detected face image should be moved to the right ("YES" at step 102), then a mark indicating a balance tipped to the right is selected in order to notify the user of the fact that the face image should be moved to the right (step 103). If the detected face image should be moved to the left ("NO" at step 102 and "YES" at step 104), then a mark indicating a balance tipped to the left is selected in order to notify the user of the fact that the face image should be moved to the left (step 105). If it is unnecessary to move the detected face image to the right and left ("NO" at step 104), then an OK mark for notifying the user that the camera angle need not be changed is selected (step 106). The mark thus selected is displayed in the vicinity of the corresponding face image. The use can verify whether the angle is the best angle by observing the mark displayed in the vicinity of the face.

Figure 13:
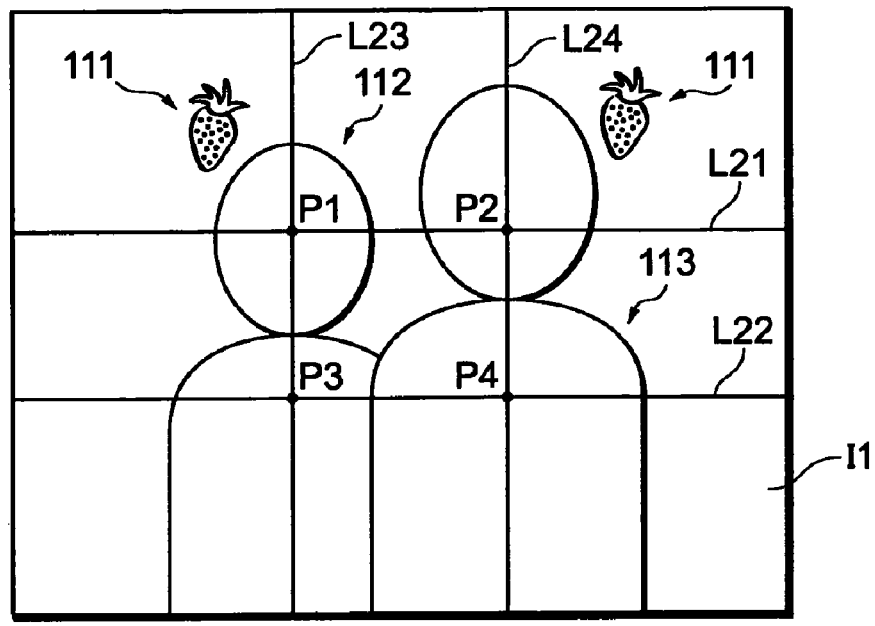
FIGS. 13 and 14 illustrate examples of images of subjects.
Figure 14:
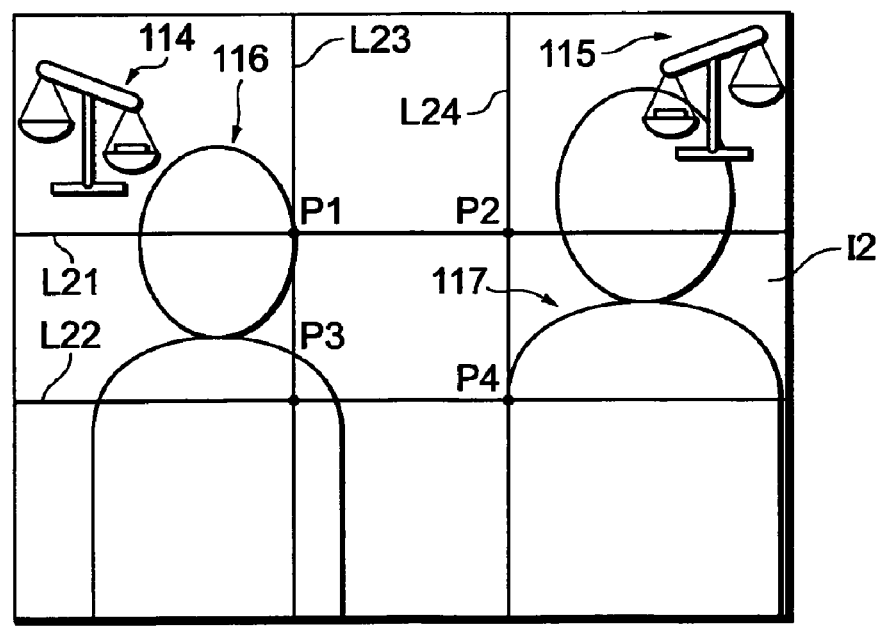

FIGS. 13 and 14 illustrate examples of images of subjects.

As shown in FIG. 13, a subject image I1 contains portrait images 112 and 113. The points of intersection P1 to P4, horizontal lines L21, L22 and vertical lines L23, L24 based upon the golden ratio also are also being displayed on the subject image I1.

The center of the face image of one subject image 112 substantially coincides with the intersection P1, and the center of the face image of the other subject image 113 substantially coincides with the intersection P2. It is considered, therefore, that both of the portrait images 112 and 113 in the subject image I1 are at good positions. Accordingly, strawberry marks 111 serving as OK marks indicating that it is unnecessary to change the positions of the face images are displayed near the face images of respective ones of the portrait images 112 and 113.

As shown in FIG. 14, a subject image I2 contains portrait images 116 and 117. The points of intersection P1 to P4, horizontal lines L21, L22 and vertical lines L23, L24 are also being displayed on the subject image I1.

The center of the face image of one subject image 116 is on the left side of intersection P1, and the center of the face image of the other subject image 117 is on the right side of the intersection P2. Accordingly, it is considered that moving the face image of one subject image 116 slightly to the right and moving the face image of the other subject image 117 slightly to the left is best for attaining an angle that is near the best angle. Therefore a balance 114 tipped to the right is displayed near the face image of one subject image 116 in order to notify the user that moving the face image of the subject image 116 to the right will result in a good position. Further, a balance 115 tipped to the left is displayed near the face image of the other subject image 117 in order to notify the user that moving the face image of the subject image 117 to the left will result in a good position. The user thus can ascertain the direction in which the portrait image 116 or 117 should be moved by viewing the balance 114 or 115.

Figure 15:
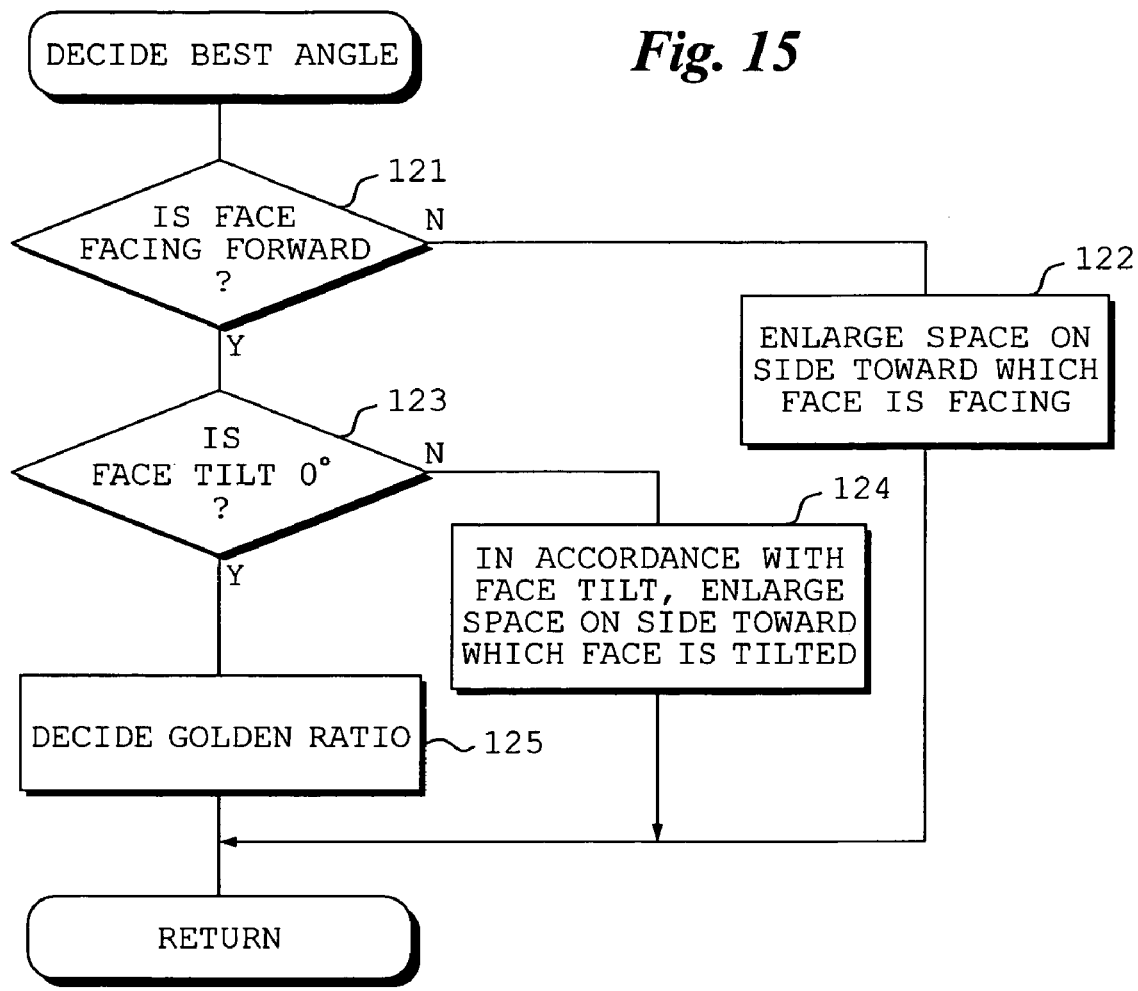
FIGS. 15 and 16 are flowcharts illustrating processing for displaying a mark.

FIG. 15 is a flowchart illustrating processing for deciding the best angle (the processing at step 101 in FIG. 12).

First, whether the detected face image is facing toward the front is checked (step 121). If the face is not facing toward the front ("NO" at step 121), then it is decided that the face image should be moved in such a manner that a space in the direction in which the face image is facing will become larger in comparison with the opposing space (step 122). If the detected face image is facing toward the front ("YES" at step 121), then whether the tilt of the face is 0° (upright attitude) is checked (step 123). If the face image is tilted ("NO" at step 123), then it is decided that the face image should be moved in accordance with the tilt so as to enlarge the space on the side toward which the face is facing (step 124). For example, the space on the side toward which the face is tilted and the space on the opposite side is enlarged. If face tilt is 0° ("YES" at step 123), then the best angle is decided based upon the golden ratio described above.

Figure 16:
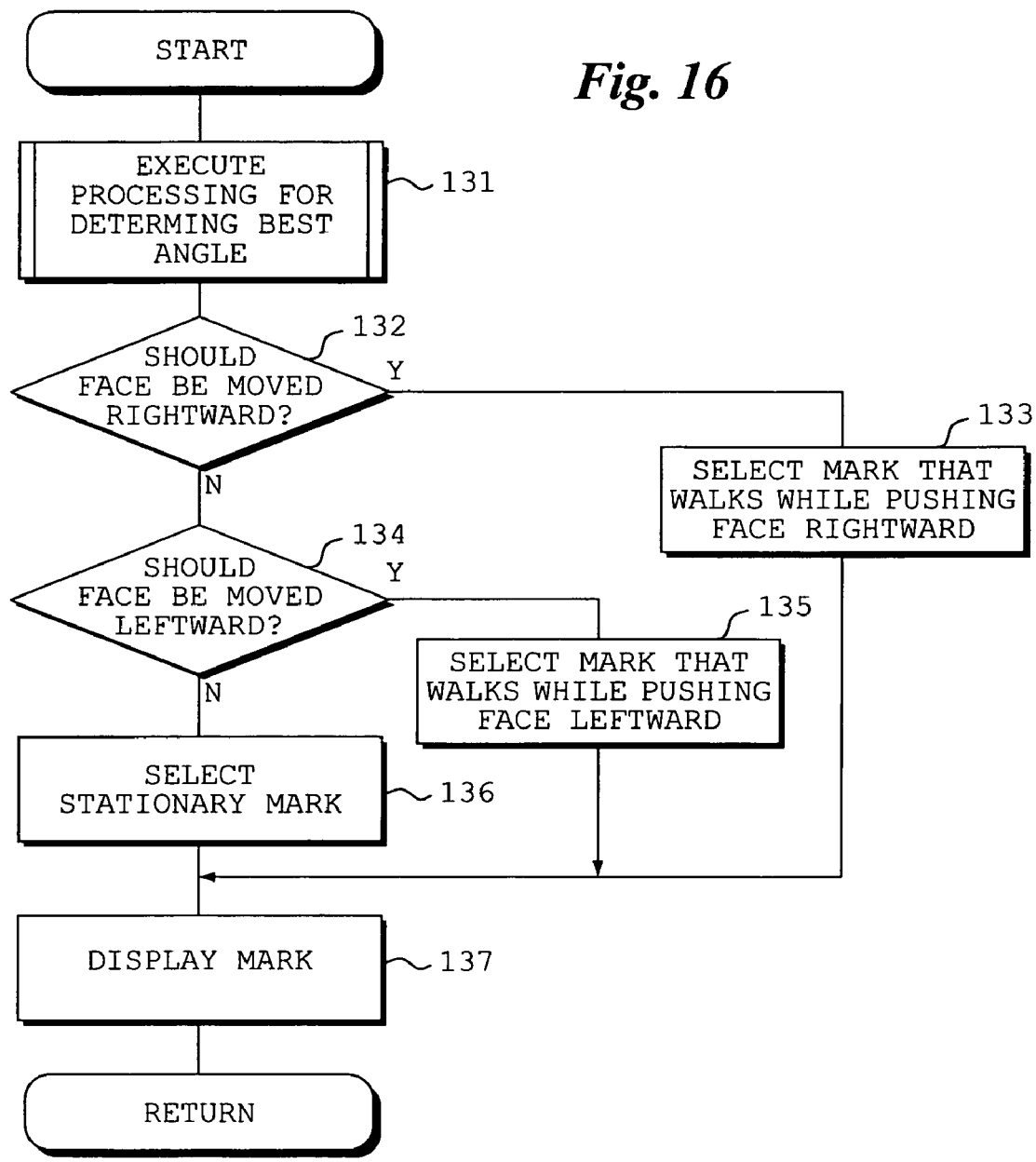

FIG. 16 is a flowchart illustrating a modification of the processing for displaying mark.

Figure 17:
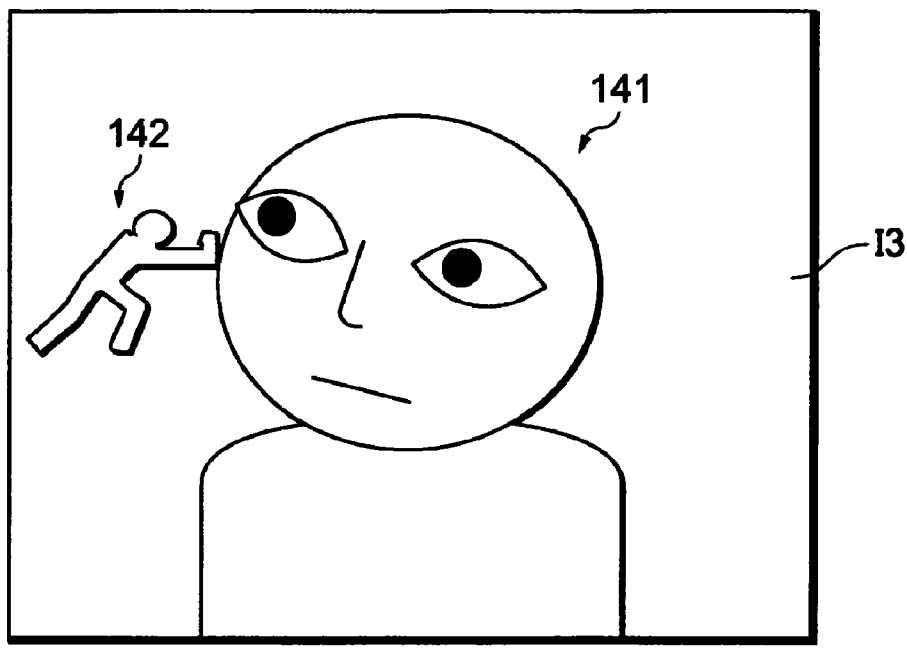
FIGS. 17 and 18 illustrate examples of the image of a subject.

The best angle of the image of the subject is decided in the manner described above (step 131). If the face image should be moved to the right ("YES" at step 132), then a mark that walks while pushing the face to the right is selected (step 133) and the mark is displayed near the face image (on the left side of the face image) (step 137). For example, as illustrated in FIG. 17, if a subject image I3 has a portrait image 141 and the face image of the portrait 141 should be moved to the right, then a mark 142 that pushes the face to the right is displayed on the left side of the face image. By observing the mark 142, the user can change the camera angle in such a manner that face image will be placed on the right side.

Figure 18:
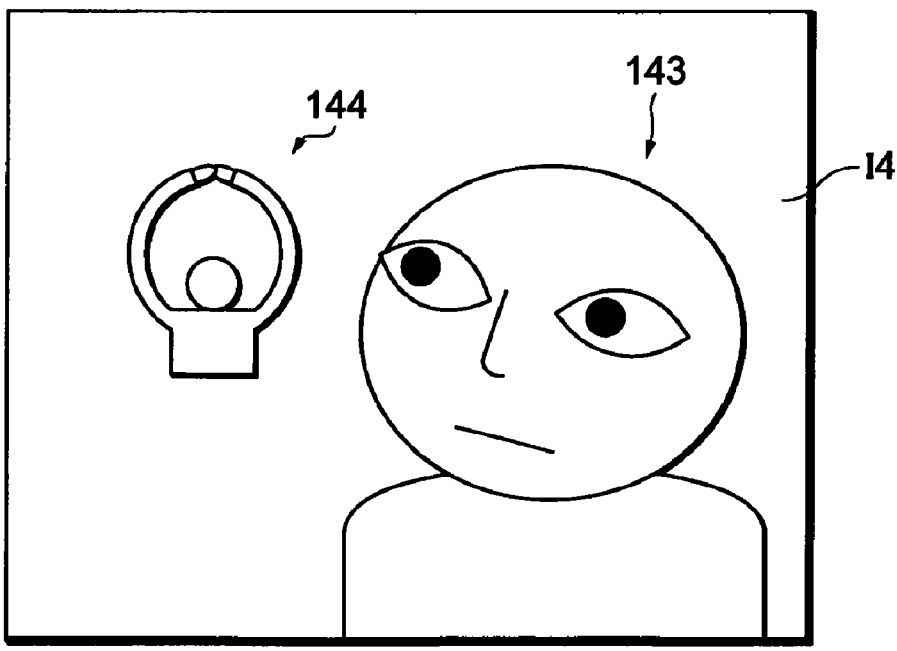

If the face image should be moved to the left ("NO" at step 132 and "YES" at step 134), a mark that walks while pushing the face to the left is selected (step 135). The selected mark is displayed near the face image (on the right side of the face image) (step 137). If the position of the face image is perfect ("NO" at step 132 and "NO" at step 134), then a stationary mark is selected (step 136) and is displayed near the face image (step 137). For example, as illustrated in FIG. 18, if a subject image I4 has a portrait image 143 and the position of the face image of the portrait 143 is perfect, then a mark 144 in which the person is stationary is displayed near the face image. By observing the mark 144, the user can tell that the angle is the best angle.

Figure 19:
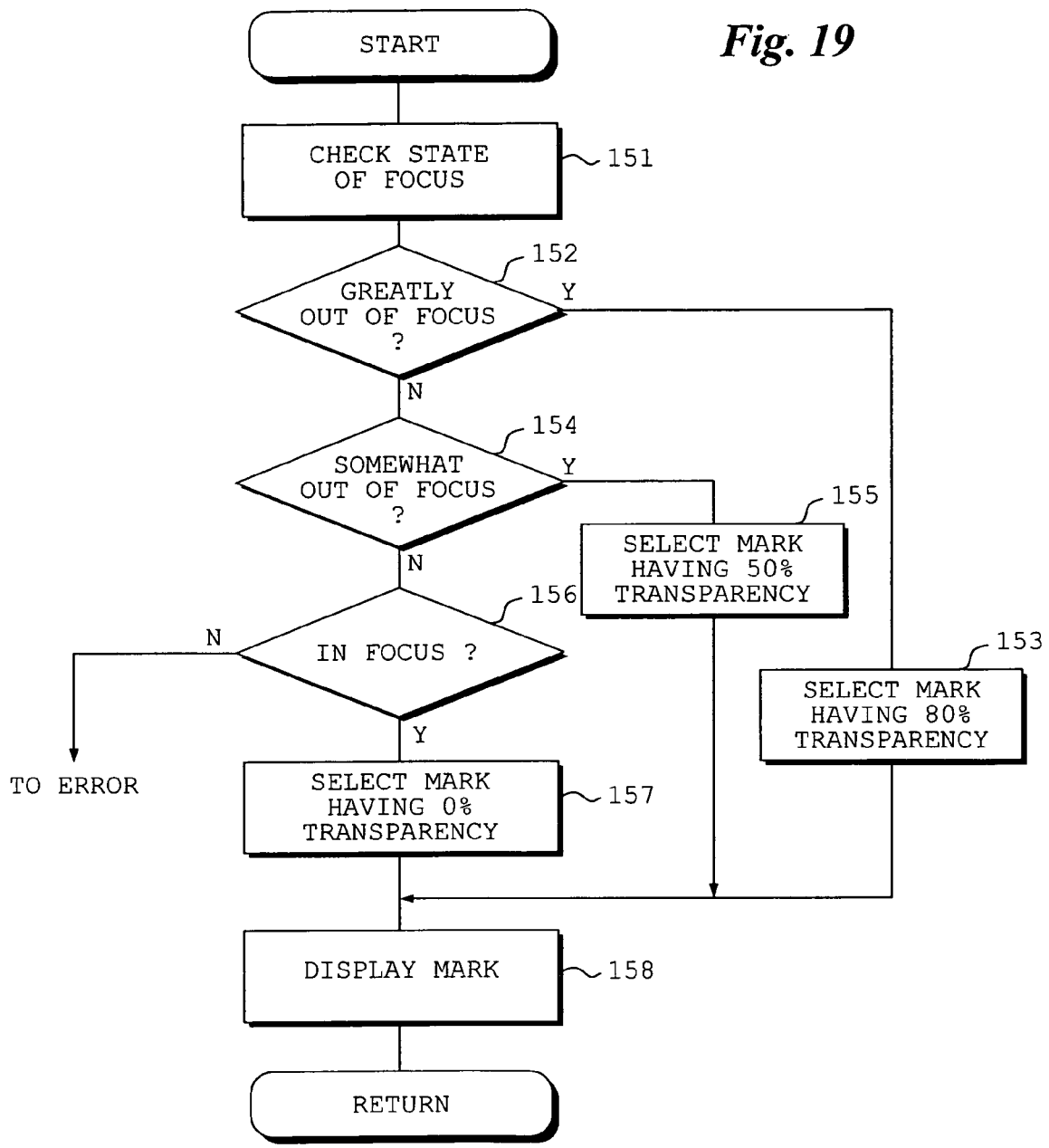
FIG. 19 is a flowchart illustrating processing for displaying a mark.

FIG. 19 is a flowchart illustrating another modification of processing for displaying a mark. This modification is such that the transparency of a displayed mark can be changed in accordance with the extent of blurring of the image of the subject.

The image of the subject obtained by image sensing is displayed on the display screen of the liquid crystal display device 28. When this occurs, the state of focus of the subject image (i.e., whether the image is in focus or not) is checked (step 151). The state of focus can be judged based upon the high-frequency components of the image of the subject. The image is considered to be in focus if there are many high-frequency components and out of focus if there are few high-frequency components.

Figure 20:
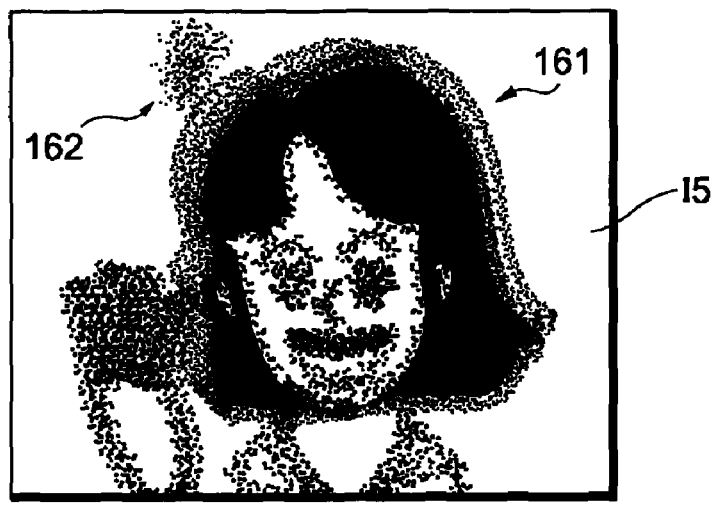
FIGS. 20 to 22 illustrate examples of images of subjects.

If the image of the subject is greatly out of focus ("YES" at step 152), then a mark whose transparency is 80% is selected (step 153). The selected mark having 80% transparency is displayed near the face image (step 158). FIG. 20 illustrates an example of a subject image I5. The subject image I5 contains a portrait image 161, which is considerably out of focus. In a case where the image of a subject is thus considerably out of focus, a mark 162, which is substantially transparent, is displayed near the face image. By observing the mark 162 of high transparency, the user can ascertain that the subject image (face image) 161 is considerably out of focus.

Figure 21:
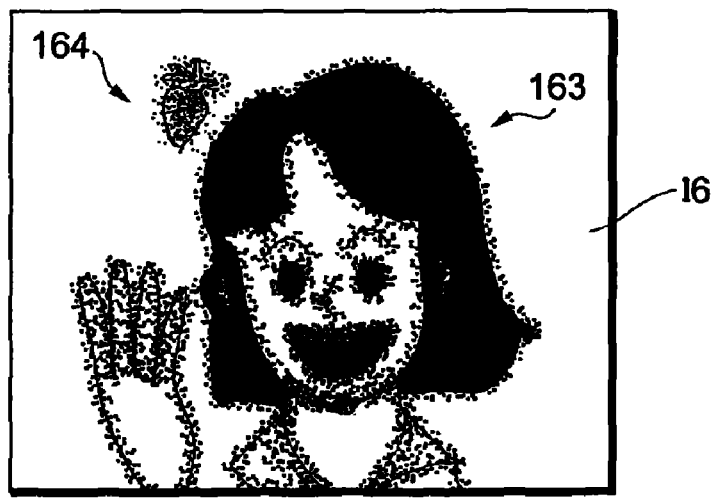

If the image of the subject is somewhat out of focus ("NO" at step 152 and "YES" at step 154), then a mark whose transparency is 50% is selected (step 155). The selected mark having 50% transparency is displayed near the face image (step 158). FIG. 21 illustrates an example of a subject image I6. The subject image I6 contains a portrait image 163, which is somewhat out of focus. In a case where the image of a subject is thus somewhat out of focus, a mark 164, which is somewhat transparent, is displayed near the face image. By observing the mark 164 that is somewhat transparent, the user can ascertain that the subject image (face image) 163 is somewhat out of focus.

Figure 22:
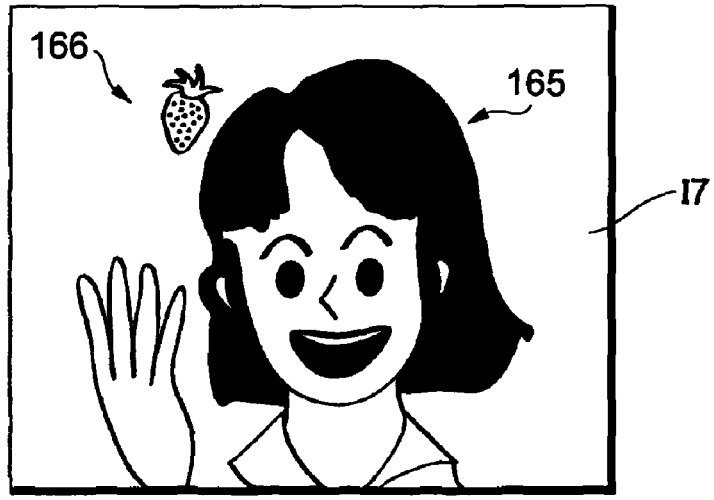

If the image of the subject is in focus ("NO" at steps 152 and 154 and "YES" at step 156), then a mark whose transparency is 0% is selected (step 157). The selected mark having 0% transparency is displayed near the face image (step 158). FIG. 22 illustrates an example of a subject image I7. The subject image I7 contains a portrait image 165, which is in focus. In a case where the image of a subject is thus in focus, a mark 166 of zero transparency is displayed near the face image. By observing the mark 166 that has no transparency, the user can ascertain that the subject image (face image) 165 is in focus.

Thus, the transparency of a displayed mark changes in accordance with the degree to which an image is in focus. By observing the mark, therefore, the user can check the degree to which the image of the subject is in focus. Marks having different transparencies may be stored in the ROM 4 in advance or may be generated when a display is presented.

Figure 23:
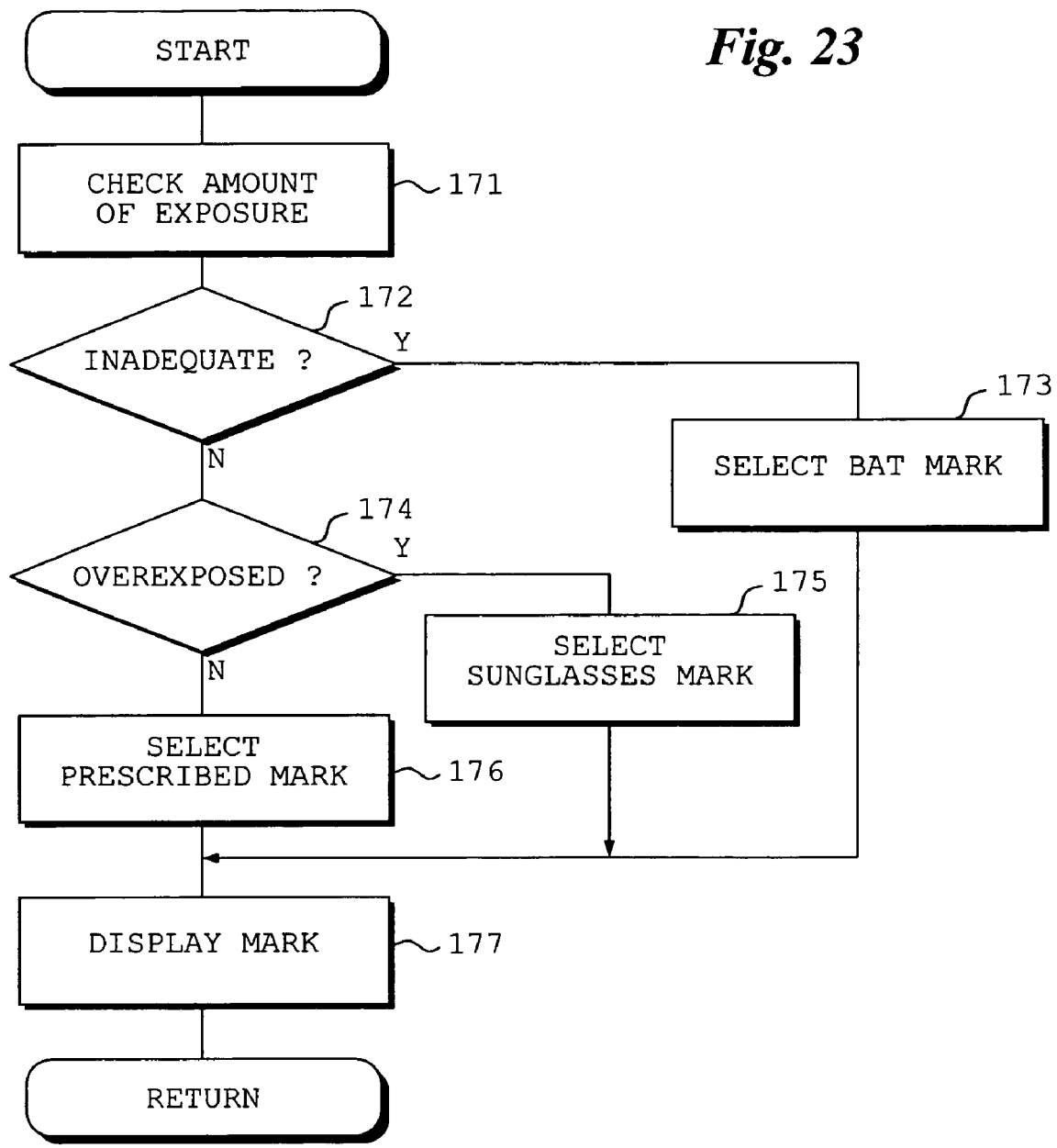
FIG. 23 is a flowchart illustrating processing for displaying a mark.

FIG. 23 is flowchart illustrating another embodiment of processing for displaying a mark. This processing procedure is such that the type of mark displayed is changed in accordance with amount of exposure.

First, the amount of exposure of the image of a subject obtained by image sensing is checked (step 171).

Figure 24:
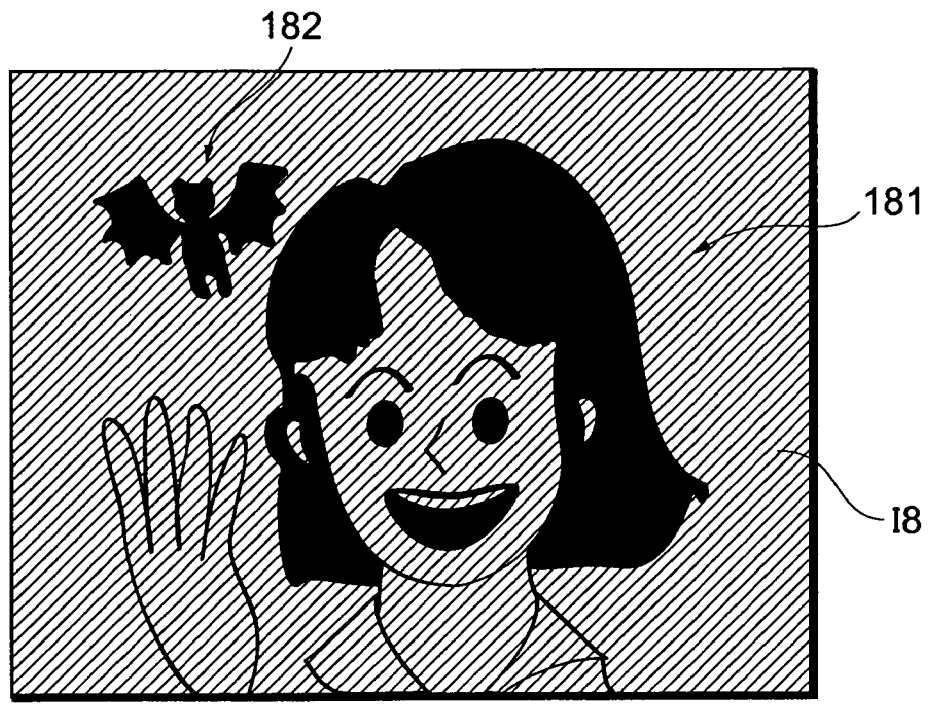
FIGS. 24 and 25 illustrate examples of the image of a subject.

If the amount of exposure is inadequate ("YES" at step 172), then a bat mark is selected in order to notify the user of inadequate exposure (step 173). The selected bat mark is displayed close to the face image (step 177). For example, as illustrated in FIG. 24, assume that the amount of exposure of a subject image I8 is inadequate. In such case a bat mark 182 is displayed near the face image of a portrait image 181 contained in the subject image I8. By observing the bat mark 182, the user can ascertain that the amount of exposure of the subject image (face image) I8 is inadequate.

Figure 25:
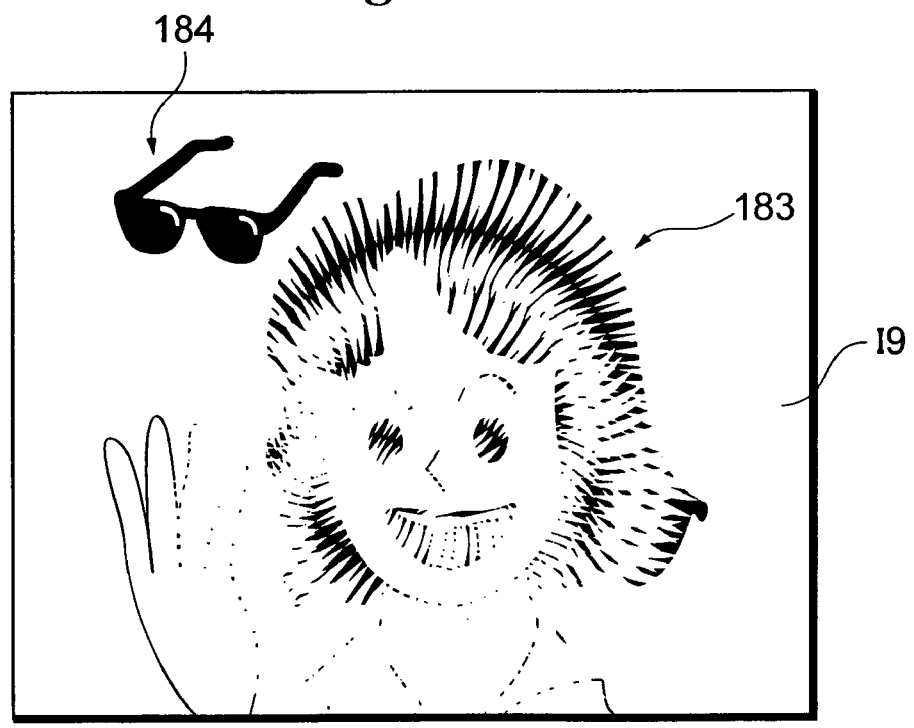

In case of overexposure ("NO" at step 172 and "YES" at step 174), a sunglasses mark is selected in order to notify the user of overexposure (step 175). The selected sunglasses mark is displayed close to the face image (step 177). For example, as illustrated in FIG. 25, assume that a subject image I9 is overexposed. In such case a sunglasses mark 184 is displayed near the face image of a portrait image 183 contained in the subject image I9. By observing the sunglasses mark 184, the user can ascertain that the subject image (face image) I9 is overexposed.

If the amount of exposure is appropriate ("NO" at steps 172 and 174), a prescribed mark is selected (step 176) and the prescribed mark selected is displayed near the face image (step 177) (see FIG. 22).

Since the type of mark changes in accordance with the amount of exposure, whether exposure is appropriate or not can be determined by viewing the mark. The amount of exposure can be adjusted as necessary.

Figure 26:
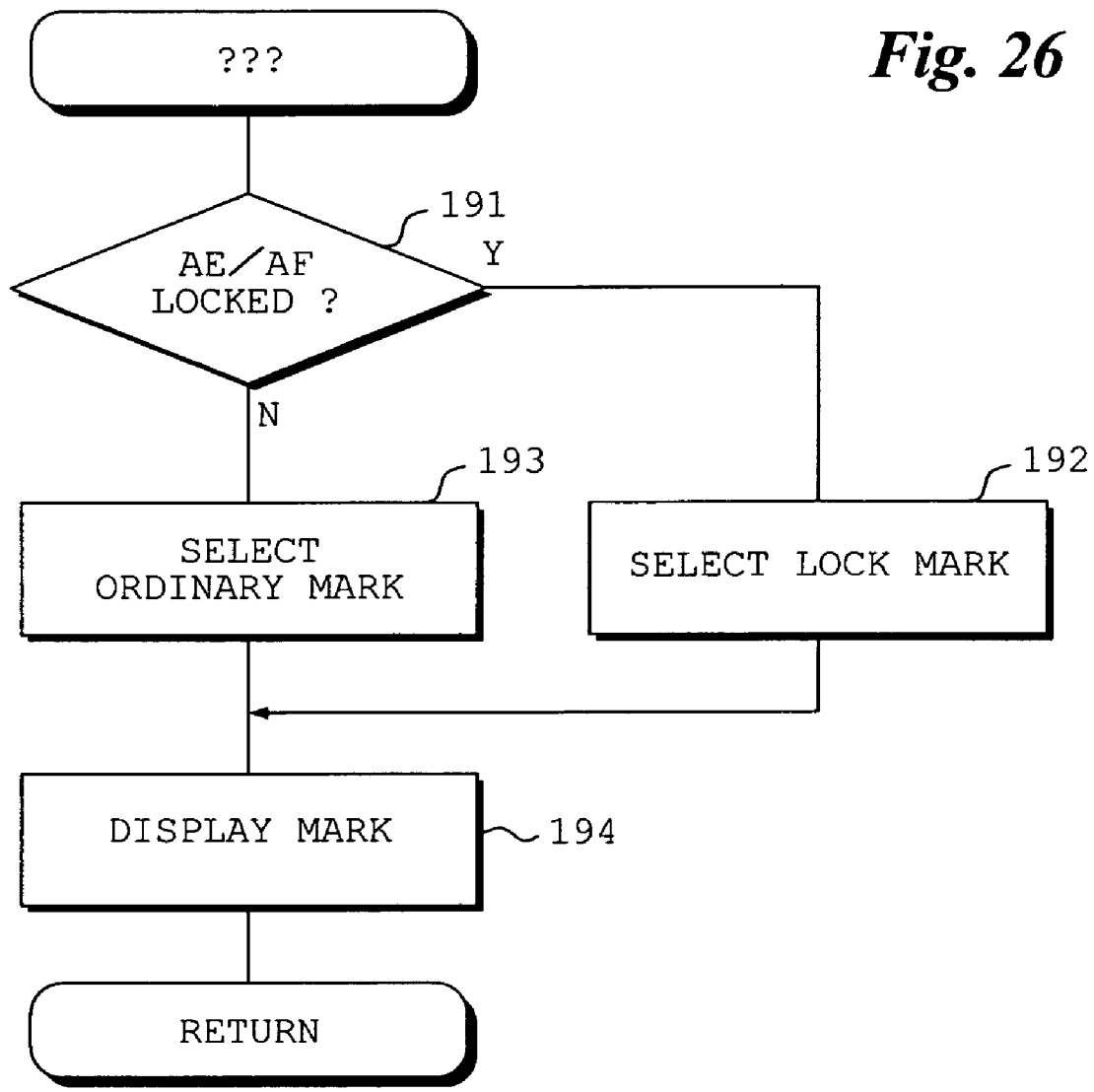
FIG. 26 is a flowchart illustrating processing for displaying a mark.

FIG. 26 is flowchart illustrating yet another embodiment of processing for displaying a mark.

In this processing, the type of displayed mark changes in accordance with whether AE (automatic exposure adjustment)/AF (automatic focus control) has been locked or not (i.e., whether the amount of exposure of the image of the subject has been rendered appropriate and whether the image of the subject is in focus).

Figure 27:
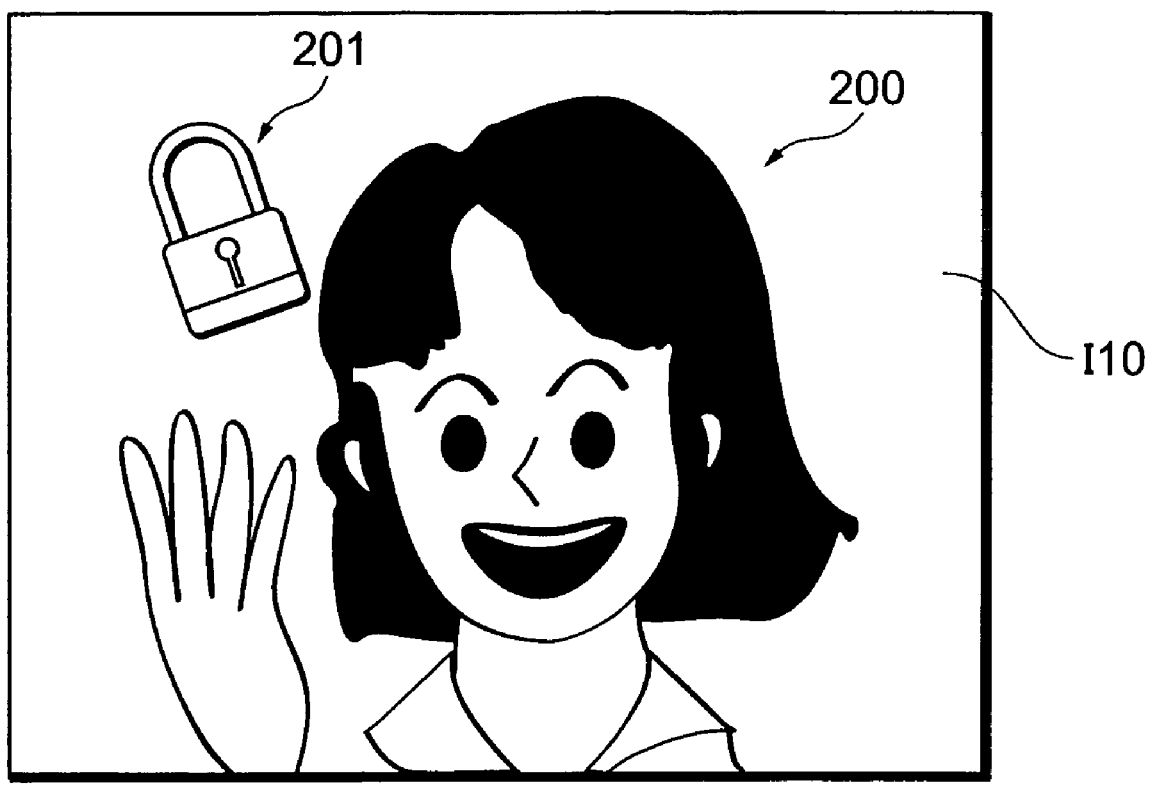
FIG. 27 illustrates an example of the image of a subject.

If AE/AF is locked ("YES" at step 191), a lock mark is selected (step 192). The selected lock mark is displayed close to the image of the subject (step 194). For example, as illustrated in FIG. 27, assume that a subject image contains a portrait image 200 and that AE/AF is in the locked state. In such case a lock mark 201 is displayed near the face image of the portrait image 200. By observing the lock mark 201, the user can ascertain that AE/AF is in the locked state.

If AE/AF is not in the locked state ("NO" at step 191, then an ordinary mark is selected (step 192). The ordinary mark selected is displayed near the face image of the subject image (step 194) (see FIG. 22). The user can determine that AE/AF is not in the locked state by confirming that the lock mark is not being displayed. Exposure adjustment processing and focusing processing can be executed as necessary.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for controlling display of detection of a target image, comprising:
    a target image detecting device for detecting the target image from within an applied image of a subject;
    a determination device for determining whether the target image has been detected by said target image detecting device;
    a display control device, responsive to a determination determined by said determination device that the target image has been detected by said target image detecting device, for controlling a display device so as to display a mark and the applied image of the subject on a display screen in such a manner that the mark will appear in the vicinity of the detected target image; and
    a deciding device for deciding a display position of the mark on the circumference of a circle based upon an angle determined by a random number;
    wherein said display control device displays the mark on the circumference of the circle having a center that is the position of the center of the target image detected by said target image detecting device, and a radius that is the distance from the center to any peripheral portion of the detected target image, and said display control device displays the mark on the display position decided by said deciding device.

2. An apparatus for controlling display of detection of a target image, comprising:
    a target image detecting device for detecting the target image from within an applied image of a subject;
    a determination device for determining whether the target image has been detected by said target image detecting device; and
    a display control device, responsive to a determination determined by said determination device that the target image has been detected by said target image detecting device, for controlling a display device so as to display a mark and the applied image of the subject on a display screen in such a manner that the mark will appear in the vicinity of the detected target image, wherein said display control device displays the mark on the circumference of a circle having a center that is the position of the center of the target image detected by said target image detecting device, and a radius that is the distance from the center to any peripheral portion of the detected target image, wherein said display control device includes:

a deciding device for deciding a position on the circumference of the circle based upon an angle determined by a random number; and a device which, in the event that the position on the circumference of the circle decided by said deciding device falls off the display screen, is for controlling said deciding device so as to repeat processing, which is for deciding a position on the circumference of the circle based upon the angle determined by the random number, until the position falls within the display screen;

the mark being displayed at the decided position on the circumference of the circle within the display screen.

3. A method of controlling an apparatus for controlling display of detection of a target image, comprising the steps of:

detecting the target image from within an applied image of a subject;

determining whether the target image has been detected;

in response to a determination that the target image has been detected. controlling a display device so as to display a mark and the applied image of the subject on a display screen in such a manner that the mark will appear in the vicinity of the detected target image; and deciding a display position of the mark on the circumference of a circle based upon an angle determined by a random number;

wherein said controlling step controls the display device to display the mark on the circumference of the circle having a center that is the position of the center of the target image detected by said detecting step, and a radius that is the distance from the center to any peripheral portion of the detected target image, and said controlling step controls the display device to display the mark on the display position decided by said deciding step.

* * * * *